US012353149B2

(12) United States Patent
Tagami et al.

(10) Patent No.: US 12,353,149 B2
(45) Date of Patent: Jul. 8, 2025

(54) TEMPERATURE DETECTION DEVICE, FIXING APPARATUS, AND IMAGE FORMING APPARATUS

(71) Applicant: Canon Kabushiki Kaisha, Tokyo (JP)

(72) Inventors: Kenichi Tagami, Tokyo (JP); Noriyuki Ito, Chiba (JP); Masafumi Maeda, Kanagawa (JP); Yusuke Nakashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 18/158,561

(22) Filed: Jan. 24, 2023

(65) Prior Publication Data

US 2023/0244162 A1 Aug. 3, 2023

(30) Foreign Application Priority Data

Jan. 31, 2022 (JP) ................................ 2022-012625
Oct. 25, 2022 (JP) ................................ 2022-170799

(51) Int. Cl.
*G03G 15/20* (2006.01)
*G03G 15/00* (2006.01)

(52) U.S. Cl.
CPC ..... *G03G 15/2017* (2013.01); *G03G 15/5045* (2013.01); *G03G 15/605* (2013.01); *G03G 15/6555* (2013.01); *G03G 15/80* (2013.01); *G03G 2215/00189* (2013.01)

(58) Field of Classification Search
CPC ........... G03G 15/2017; G03G 15/5045; G03G 15/605; G03G 15/6555; G03G 15/80; G03G 2215/00189
See application file for complete search history.

(56) References Cited

U.S. PATENT DOCUMENTS

2002/0071700 A1* 6/2002 Nishitani ........... G03G 15/2039 399/328
2013/0209147 A1* 8/2013 Ogawa ............... G03G 15/2053 399/329
2015/0139709 A1* 5/2015 Ohta .................. G03G 15/2053 399/329

FOREIGN PATENT DOCUMENTS

JP 2002122489 A 4/2002
JP 2002181630 A 6/2002
JP 2002267543 A 9/2002

* cited by examiner

*Primary Examiner* — Stephanie E Bloss
*Assistant Examiner* — Michael A Harrison
(74) *Attorney, Agent, or Firm* — Venable LLP

(57) ABSTRACT

A fixing apparatus includes a heater including a heating member, a heater holder configured to hold the heater, a detection element configured to detect a temperature of the heater and disposed at a position that faces the heater in a third direction, a first holding member configured to hold the detection element, an urging member configured to urge the first holding member, a flexible member extending in the first direction and configured to support the first holding member on a first end portion of the flexible member in the first direction, and a second holding member configured to hold a second end portion of the flexible member in the first direction. The flexible member is flexible such that the first holding member and the second holding member are movable relative to each other in the third direction.

33 Claims, 13 Drawing Sheets

TEMPERATURE DETECTION DEVICE, FIXING APPARATUS, AND IMAGE FORMING APPARATUS

BACKGROUND OF THE INVENTION

Field of the Invention

The present invention relates to a temperature detection device that is used for a fixing apparatus, the fixing apparatus that fixes an image to a recording material, and an image forming apparatus that forms an image on a recording material.

Description of the Related Art

An electrophotographic image forming apparatus includes a heat-fixing fixing apparatus that fixes an image transferred onto a recording material by using toner, to the recording material by heating the image. The heat-fixing fixing apparatus includes a temperature detection device used for performing temperature control or detecting an abnormal heating state. Japanese Patent Application Publication No. 2002-181630 describes a temperature detection device that includes a heat-resistant elastic member, a detection-element holding member, and a compression spring. The heat-resistant elastic member has a bottom surface on which a detection element is disposed for detecting the temperature of a ceramic heater. The detection-element holding member holds a top surface of the heat-resistant elastic member. The compression spring urges the detection-element holding member toward the ceramic heater.

In the configuration described in Japanese Patent Application Publication No. 2002-181630, however, since the detection element is forced to be in pressure contact with the ceramic heater by the elastic force of the heat-resistant elastic member, the detection accuracy of the temperature detection device is affected by the mechanical property of the heat-resistant elastic member. For this reason, the material of the heat-resistant elastic member is selected so that the creep deformation and denaturation of the material will hardly occur even though the material is exposed to high temperature for a long period of time. However, the material causes the increase in cost.

SUMMARY OF THE INVENTION

The present invention provides a temperature detection device, a fixing apparatus, and an image forming apparatus that can improve positional accuracy of a detection element with a simple configuration.

According to one aspect of the invention, a fixing apparatus includes a heater including a heating member, a first direction being a longitudinal direction of a surface of the heater on which the heating member is disposed, a second direction being a widthwise direction of the surface of the heater, a heater holder configured to hold the heater, a detection element configured to detect a temperature of the heater and disposed at a position that faces the heater in a third direction, the third direction being a thickness direction of the heater orthogonal to both of the first direction and the second direction, a first holding member configured to hold the detection element, an urging member configured to urge the first holding member, a flexible member extending in the first direction and configured to support the first holding member on a first end portion of the flexible member in the first direction, and a second holding member configured to hold a second end portion of the flexible member in the first direction, wherein the flexible member is flexible such that the first holding member and the second holding member are movable relative to each other in the third direction, wherein the second holding member includes a positioning portion configured to engage with the heater holder and position the second holding member in the first direction and the second direction, and wherein the first holding member is urged by the urging member toward the heater in the third direction.

According to another aspect of the invention, a temperature detection device includes a detection element including a surface that faces a measurement object and configured to detect a temperature of the measurement object, a first direction being a direction of a first side of the surface, a second direction being a direction of a second side of the surface orthogonal to the first side, a third direction being a direction orthogonal to both of the first direction and the second direction, the detection element being disposed so as to face the measurement object in the third direction, a first holding member configured to hold the detection element, an urging member configured to urge the first holding member, a flexible member extending in the first direction and configured to support the first holding member on a first end portion of the flexible member in the first direction, and a second holding member configured to hold a second end portion of the flexible member in the first direction, wherein the flexible member is flexible such that the first holding member and the second holding member are movable relative to each other in the third direction, wherein the second holding member includes a positioning portion configured to position the second holding member in the first direction and the second direction, and wherein the first holding member is urged by the urging member toward the measurement object in the third direction.

Further features of the present invention will become apparent from the following description of exemplary embodiments with reference to the attached drawings.

DESCRIPTION OF THE EMBODIMENTS

Hereinafter, some embodiments of the present disclosure will be described with reference to the accompanying drawings.

Image Forming Apparatus

Figure 8:
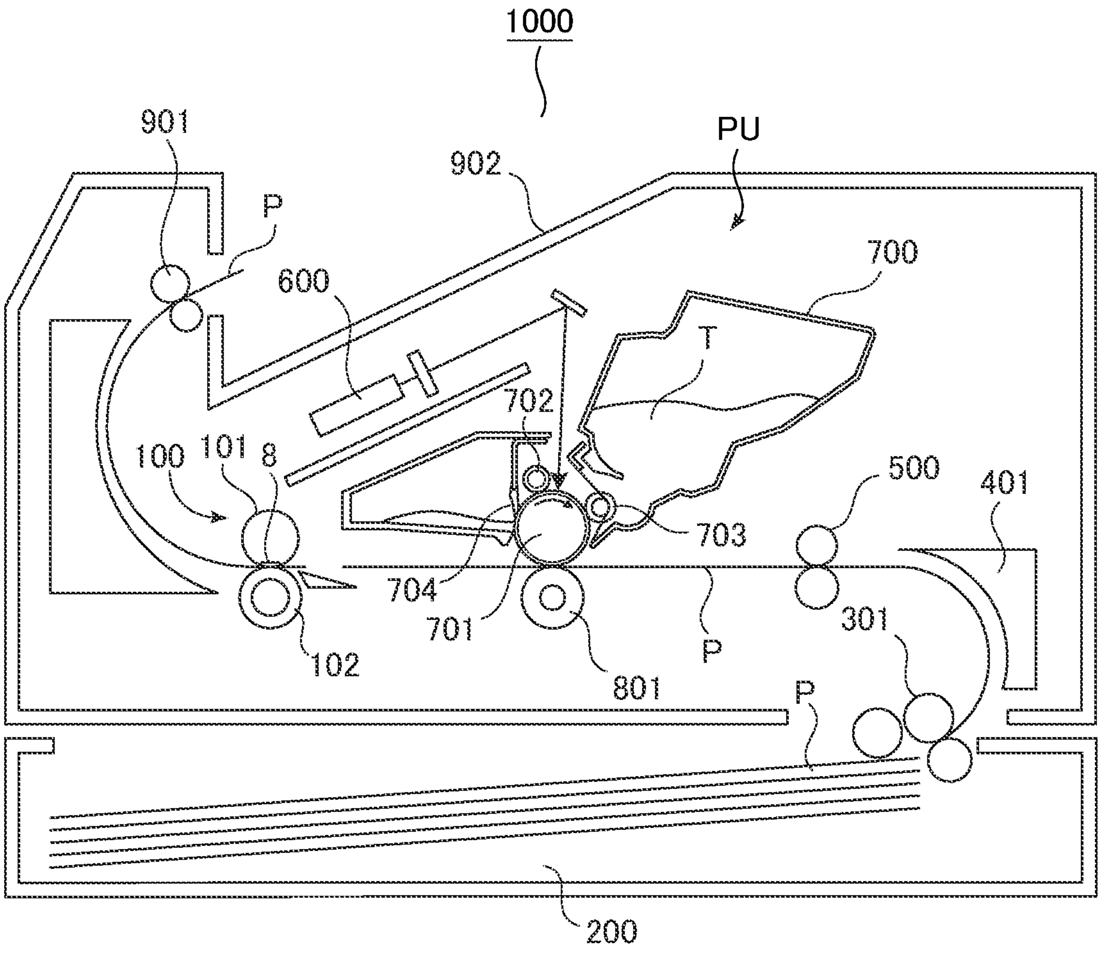
FIG. 8 is a schematic diagram of an image forming apparatus of an embodiment.

FIG. 8 illustrates an example of an image forming apparatus 1000 of the present embodiment. The image forming apparatus 1000 is an electrophotographic single-function printer that forms an image on a sheet P in accordance with image information sent from an external apparatus. Note that the image forming apparatus may not be a single-function printer and may be a copying machine or a multi-function printer. The sheet P, which is a recording material, may be a paper sheet, such as a plain paper sheet or a thick paper sheet, a plastic film, a cloth sheet, a sheet material, such as a coated paper sheet, on which certain surface treatment was performed, a specially-shaped sheet material, such as an envelope or an index paper sheet, or any one of a variety of sheets having different sizes and materials.

The image forming apparatus 1000 includes a process unit PU that serves as an image forming portion, a fixing apparatus 100, and a conveyance mechanism that feeds and conveys the sheet P one by one. The process unit PU includes a photosensitive drum 701 that serves as an image bearing member, a charging roller 702 that serves as a charging portion, a scanner unit 600 that serves as an exposing portion, and a developing roller 703 that serves as a developing portion. In addition, the process unit PU includes a transfer roller 801 that serves as a transfer portion, and a drum cleaner 704 that serves as a cleaning portion. The photosensitive drum 701 is an electrophotographic photoreceptor that is formed like a drum (cylinder). The photosensitive drum 701, the charging roller 702, the developing roller 703, and the drum cleaner 704 are part of a process cartridge that can be attached to and detached from the image forming apparatus body (thus, the photosensitive drum 701, the charging roller 702, the developing roller 703, and the drum cleaner 704 can be attached to and detached from the image forming apparatus body, as one body).

When an execution command (i.e., a print job signal) for an image forming operation is sent to the image forming apparatus 1000, a series of below-described image forming operations are started. First, a feed roller 301 is rotated, and an uppermost sheet of sheets P stacked in a feeding tray 200 is fed one by one. The sheet is then guided by a conveyance guide 401, and conveyed to a conveyance roller pair 500.

In parallel with the conveyance of the sheet P, the process unit PU forms a toner image in an electrophotographic process, in accordance with image information sent from an external apparatus. That is, the photosensitive drum 701 is driven and rotated, and the surface of the photosensitive drum 701 is uniformly charged by the charging roller 702. The scanner unit 600 performs an exposure process by modulating a laser beam in accordance with the image information and emitting the modulated laser beam to the surface of the photosensitive drum 701, and thereby forms an electrostatic latent image on the surface of the photosensitive drum 701. The developing roller 703 develops the electrostatic latent image by using developer that contains toner, and thereby visualizes the electrostatic latent image as a toner image.

The conveyance roller pair 500 sends the sheet P to a transfer portion formed between the photosensitive drum 701 and the transfer roller 801, at a timing at which the toner image formed on the photosensitive drum 701 reaches the transfer portion. In the transfer portion, the toner image is transferred from the photosensitive drum 701 to the sheet P by a predetermined voltage being applied to the transfer roller 801. The sticking substance, such as transfer residual toner, left on the surface of the photosensitive drum 701 after the sheet P has passed through the transfer portion is removed by the drum cleaner 704.

The sheet P having passed through the transfer portion is conveyed to the fixing apparatus 100. The fixing apparatus 100 is a heat-fixing fixing apparatus that includes a fixing member (i.e., a first rotary member), a pressing member (i.e., a second rotary member), and a heating portion. The fixing member and the pressing member form a nip portion between the fixing member and the pressing member, and the heating portion heats an image formed on a recording material. A configuration of the fixing apparatus 100 of the present embodiment will be described below.

The sheet P having passed through the fixing apparatus 100 is discharged to the outside of the image forming apparatus body by a discharging roller pair 901, and stacked on a discharging tray 902.

Fixing Apparatus

Figure 9:
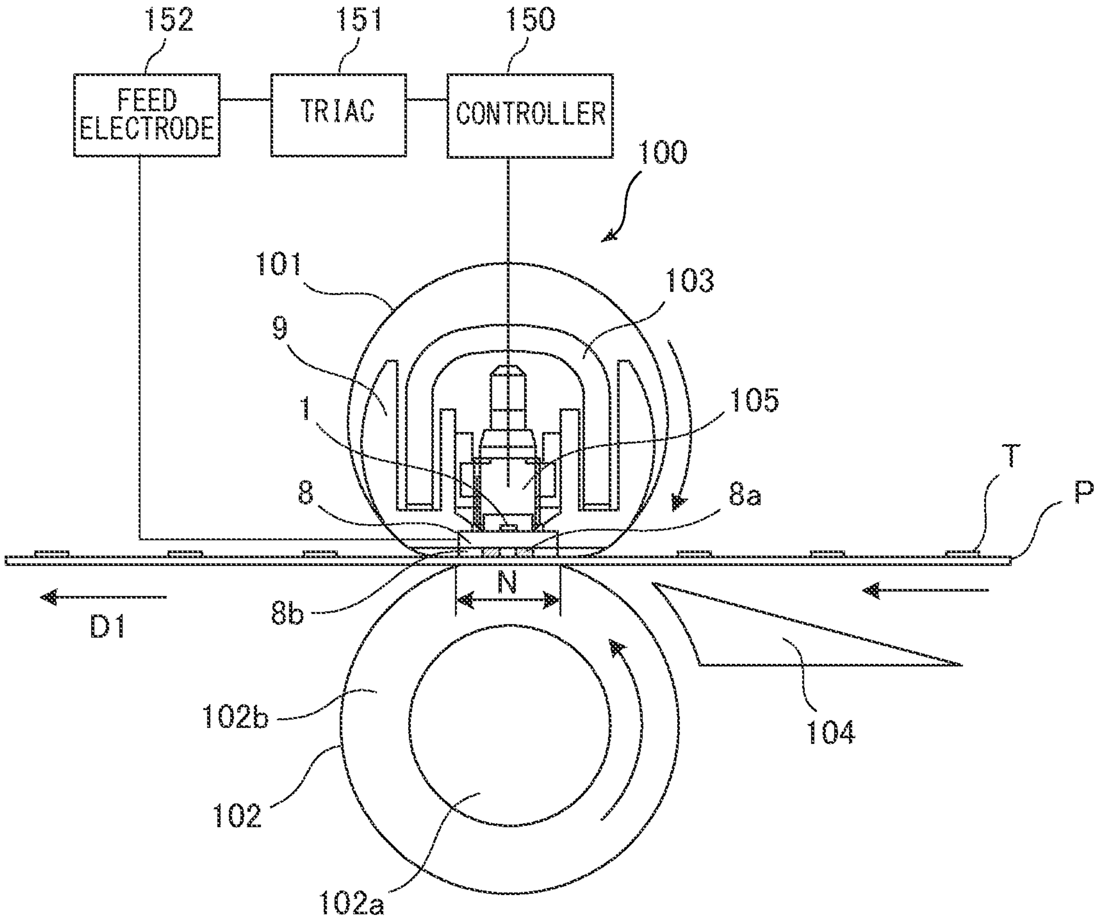
FIG. 9 is a schematic diagram of a fixing apparatus of an embodiment.

FIG. 9 illustrates a cross-sectional view of the fixing apparatus 100, as one example. FIG. 9 is a schematic diagram of a cross section of the fixing apparatus 100 in a virtual plane perpendicular to the longitudinal direction of a nip portion N (i.e., the main scanning direction in image formation), which is orthogonal to a recording-material conveyance direction D1 in the nip portion N.

The fixing apparatus 100 includes a film 101, a pressing roller 102, a heater 8, a heater holder 9, and a stay 103.

The heater 8 includes a heater substrate in which a pattern of a resistance heating element 8*a* is formed on a plate-like ceramic substrate that is narrow and elongated in the longitudinal direction. The front surface of the heater 8 is coated with a glass layer 8*b*, which serves as a protective layer that covers the resistance heating element 8*a*. On the back surface of the heater 8, the detection element 1 of the temperature detection device 105, which will be described below, is disposed adjacent to the heater 8.

The resistance heating element 8*a* generates heat when fed with electricity (energized) from a power supply circuit (not illustrated) via a feed electrode 152. A control portion 150 that serves as a controller disposed in the image forming apparatus controls the amount of electric power fed to the heater 8. Specifically, the control portion 150 performs ON/OFF control on a triac 151 so that the temperature detected by the temperature detection device 105 is kept at a predetermined target temperature (i.e., a fixing temperature). The control portion 150 includes one or more processors that includes a central processing unit (CPU), and a memory that provides a memory area; and controls each part of the image forming apparatus by causing the CPU to read a program from the memory and execute the program.

The film 101 is a tubular heat-resistant film having a three-layer structure. The innermost layer of the film 101 is a base layer, which determines the mechanical property of the film 101, such as the torsional strength and the smoothness of the film 101. For example, the base layer is made of resin, such as polyimide, polyamide-imide, PEFK, PES, or PPS. Note that PEFK is polyether ether ketone, PES is polyether sulfone, and PPS is polyphenylene sulfide. The next layer on the base layer is a conductive primer layer. The conductive primer layer is a conductive layer in which conductive particles, such as carbon black, are dispersed; and serves as adhesive that bonds the third layer and the base layer to each other. The outermost layer is a top layer. The top layer is designed so as to have a proper resistance value and thickness for preventing various image defects.

The heater holder 9 is a holding member that holds the heater 8. The heater holder 9 is molded with a heat-resistant resin, such as PPS or liquid crystal polymer. The heater holder 9 serves also as a guide member that facilitates smooth rotation of the film 101.

The heater 8 and the heater holder 9 are disposed in the internal space of the film 101. The heater 8 and the heater holder 9, together with the pressing roller 102, constitute a nip forming unit that forms the nip portion N. Note that instead of the configuration in which the heater 8 slides on the inner surface of the film 101, a sheet-like or plate-like sliding member that slides on the inner surface of the film 101 may be disposed between the heater 8 and the film 101. In this case, the sliding member is also one part of the nip forming unit.

The stay 103 is made of a metal, such as iron or aluminum. The stay 103 suppresses the creep deformation of the heater holder 9. That is, the stay 103 plays a role for increasing the rigidity of the support structure that supports the heater 8. In addition, since the stay 103 receives the urging force from an urging member or spring member (not illustrated), applied to the stay 103 in a downward direction in FIG. 9, a predetermined pressure is produced in the nip portion N.

The pressing roller 102 is an elastic roller in which a core metal 102*a* is covered with a heat-resistant elastic member 102*b*. The core metal 102*a* is made of aluminum or cast iron, and the elastic member 102*b* is made of silicon rubber or the like. The front layer of the pressing roller 102 is a coating of fluororesin, such as PFA, PTFE, or FEP, that has excellent releasability to the toner. Note that PFA is tetrafluoroethylene-perfluoroalkylvinyl ether copolymer, PTFE is polytetrafluoroethylene, and FEP is perfluoro ethylene propylene copolymer.

The pressing roller 102 is in pressure contact with the heater 8 interposing the film 101 therebetween, and the pressure contact portion of the pressing roller 102 constitutes the nip portion N (i.e., a fixing nip). The pressing roller 102 is rotated by the driving force of a motor (that serves as a driving source) disposed in the image forming apparatus body. The film 101 is rotated by the rotation of the pressing roller 102, by the frictional force that the film 101 receives from the pressing roller 102 in the nip portion N.

The sheet P to which an image has been transferred in the transfer portion is guided by a guide 104, and conveyed to the nip portion N of the fixing apparatus 100. The fixing apparatus 100 causes the film 101 heated by the heater 8, to heat toner T that forms the image on the sheet P, while causing the film 101 and the pressing roller 102 to nip and convey the sheet P in the nip portion N. In this operation, the toner T is softened by the toner T being heated and pressed, so that a fixed image formed by the toner fixed to the sheet P is obtained.

Temperature Detection Device: Comparative Embodiment

Figure 10A:
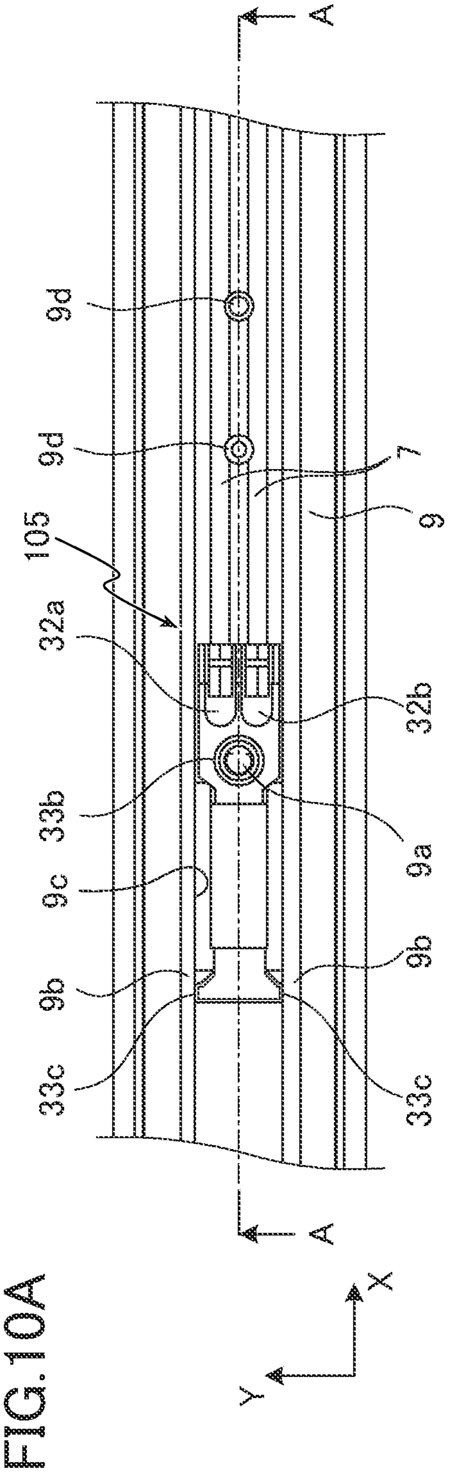
FIG. 10A is a plan view of a temperature detection device of a comparative embodiment.
Figure 10B:
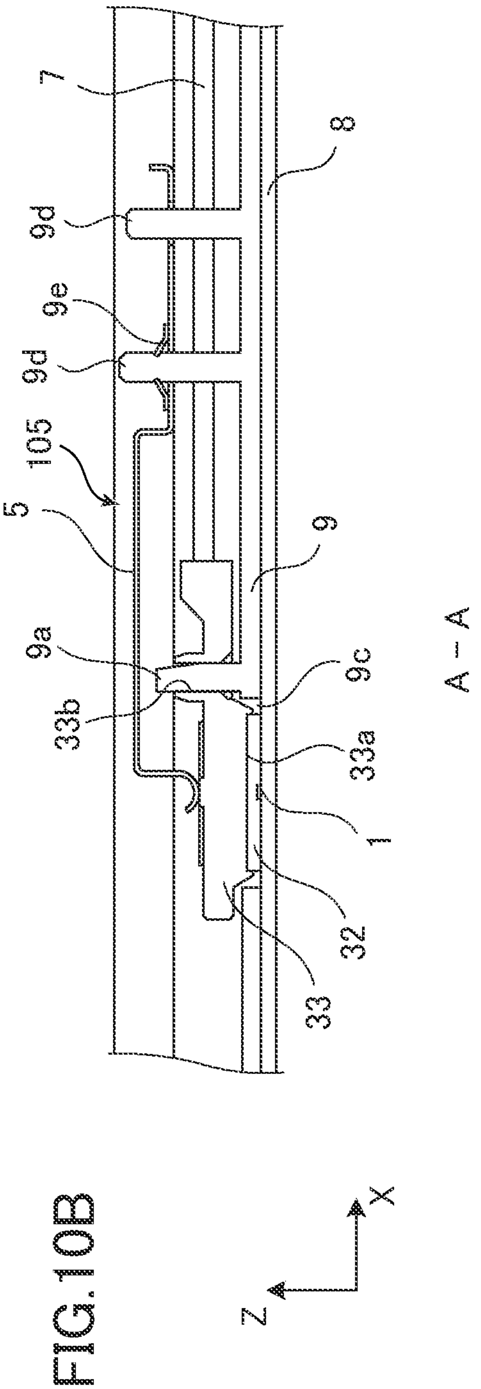
FIG. 10B is a cross-sectional view of the temperature detection device of the comparative embodiment.
Figure 11:
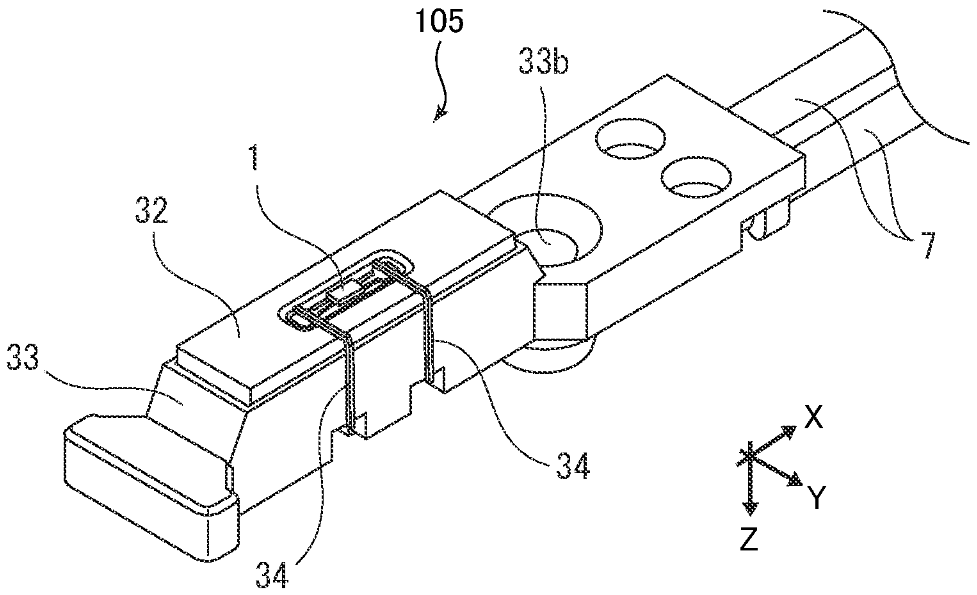
FIG. 11 is a perspective view of the temperature detection device of the comparative embodiment.

Next, an outline of a temperature detection device of the present embodiment will be described, compared with a temperature detection device of a comparative embodiment. FIG. 10A is a plan view of a temperature detection device 105 of the comparative embodiment. FIG. 10B is a cross-sectional view of the temperature detection device 105 of the comparative embodiment, taken along a line A-A of FIG. 10A. FIG. 11 is a perspective view of the temperature detection device 105 of the comparative embodiment.

In the following description and the accompanying drawings, the longitudinal direction of the nip portion N of the fixing apparatus 100 is defined as an X direction, a direction along the recording-material conveyance direction (+Y direction) in the nip portion N is defined as a Y direction, and a direction orthogonal to both of the X direction and the Y direction is defined as a Z direction. In addition, a +Z direction may be referred to as an upward direction with respect to the temperature detection device 105, and a −Z direction may be referred to as a downward direction with respect to the temperature detection device 105. In addition, if necessary, each of the X, Y, and Z directions is given a "+" symbol if the direction is indicated by an arrow, or a "−" symbol if the direction is opposite to the direction indicated by the arrow. For example, the +Z direction corresponds to a side on which the heater 8 is positioned with respect to the pressing roller 102, and the −Z direction corresponds to a side opposite to the side on which the heater 8 is positioned with respect to the pressing roller 102. The X direction is a direction (i.e., the longitudinal direction of the heater 8, or a first direction) in which a first side of a plane extends. The plane is a plane via which the detection element 1 of the temperature detection device 105 faces the heater 8. The Y direction is a direction (i.e., the widthwise or lateral direction of the heater 8, or a second direction) in which a second side of the plane orthogonal to the first side extends. The plane is a plane via which the detection element 1 faces the heater 8. The Z direction is a third direction orthogonal to both of the first direction and the second direction (that is, the Z direction is a thickness direction orthogonal to both of the longitudinal direction and the widthwise direction of the heater 8). Note that the plane via which the detection element 1 faces the heater 8 may not be a rectangular plane having the first side and the second side. That is, the direction (first direction) of the first side and the direction (second direction) of the second side of the plane, via which the detection element 1 faces the measurement object (i.e., the heater 8), have only to be directions orthogonal to each other in a virtual plane perpendicular to a direction in which the detection element 1 faces the measurement object.

As illustrated in FIGS. 10A and 10B, and FIG. 11, the temperature detection device 105 includes the detection element 1, a detection element holder 33, a heat-resistant elastic member 32, an urging member 5, and harnesses 7.

The detection element 1 is an element that converts the temperature of a measurement object (that is an object to be measured, and is the heater 8 in the comparative embodiment) to an electric signal. The control portion 150 detects the temperature of the heater 8, based on a resistance value determined by a voltage that is applied to the thin-film thermistor and a current that flows through the thin-film thermistor.

The detection element holder 33 is a support member (i.e., a detection-element holding unit) that supports the detection element 1. The detection element holder 33 has a holding surface 33*a* that holds the heat-resistant elastic member 32. The holding surface 33*a* is formed in a lower surface (on the −Z direction side) of the detection element holder 33.

The heat-resistant elastic member 32 is a plate-like elastic member (pad) whose thickness direction is the Z direction, and which is substantially rectangular in the X and Y directions. The detection element 1 is attached to an attachment portion disposed in a lower surface (on the −Z direction side) of the heat-resistant elastic member 32.

At an end portion of the detection element holder 33 in the +X direction, two stainless-steel plates 32*a* and 32*b* are molded integrally with the detection element holder 33. The stainless-steel plates 32*a* and 32*b* are electrically isolated from each other. The stainless-steel plates 32*a* and 32*b* are electrically connected with the terminals of the detection element 1 via two Dumet wires 34 (FIG. 11). In addition, the two harnesses (electric wires) 7 are led from the stainless-steel plates 32*a* and 32*b* toward the +X direction, and are connected with an electric circuit of the image forming apparatus body. In this manner, the temperature detection device 105 is electrically connected with the control portion 150.

The detection element holder 33 includes a positioning hole portion 33*b*, and two positioning projection 33*c*. The positioning hole portion 33*b* is an opening portion that fits on a positioning projection 9*a* formed on the heater holder 9. The positioning projections 33*c* are portions of the detection element holder 33 that engage with two positioning walls 9*b* disposed in the heater holder 9. By the positioning hole portion 33*b* fitting on the positioning projection 9*a*, the detection element holder 33 is positioned with respect to the heater holder 9 in the X and Y directions. Specifically, the detection element holder 33 is positioned with respect to the axis of the positioning projection 9*a* in the X and Y directions. In addition, by the positioning projections 33*c* engaging with the positioning walls 9*b*, the detection element holder 33 is prevented from rotating on the positioning projection 9*a*.

The heater holder 9 has a hole portion (window portion) 9*c* formed so as to pass through the heater holder 9 in the Z direction. In a state where the detection element holder 33 is positioned with respect to the heater holder 9, the detection element 1 is exposed to the interior of the hole portion 9*c* when viewed from the −Z direction.

The urging member 5 is in contact with a surface of the detection element holder 33 on the +Z direction side, and urges the detection element holder 33 toward the −Z direction. The urging member 5 includes hole portions that fit on spring attachment portions (projections) 9*d* formed on the heater holder 9, and is fixed to the heater holder 9 via a fixing component 9*e*. The urging member 5 is a plate spring whose end portion extending from the spring attachment portions 9*d* toward the −X direction abuts against the detection element holder 33. The detection element 1 is brought into contact with the heater 8 in the interior of the hole portion 9*c*, by the urging force of the urging member 5. In addition, since the heat-resistant elastic member 32 elastically deforms in a space between the holding surface 33*a* of the detection element holder 33 and the back surface (on the +Z direction side of the substrate) of the heater 8, the detection element 1 is stably in contact with the heater 8.

As described above, for the detection element 1 to accurately measure the temperature of the measurement object, it is required to increase the positional accuracy of the detection element 1 to the measurement object. In the above-described comparative embodiment, however, even though the detection element 1 can be stably in contact with the heater 8 by the elastically-deformable heat-resistant elastic member 32, the material of the heat-resistant elastic member 32 is limited to specific materials, which leads to the increase in cost. Note that examples of the material of the heat-resistant elastic member 32 include silicon rubber, fluororubber, ceramic paper with cushioning property, and glass wool.

First Embodiment

Hereinafter, a temperature detection device of a first embodiment will be described. Like the temperature detection device of the comparative embodiment, the temperature detection device of the present embodiment can be used for detecting the temperature of the heater 8 in the image forming apparatus described with reference to FIGS. 8 and 9. In the following description, a component having substantially the same structure and effect as those of a component of the comparative embodiment is given the same symbol as that of the component of the comparative embodiment, and the description thereof will be omitted.

Figure 1A:
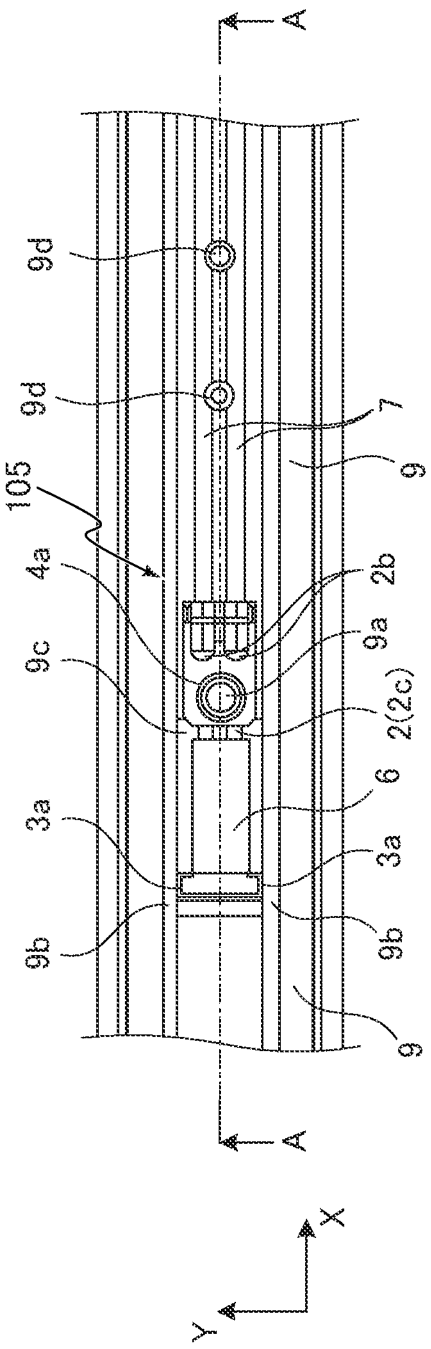
FIG. 1A is a plan view of a temperature detection device of a first embodiment.
Figure 1B:
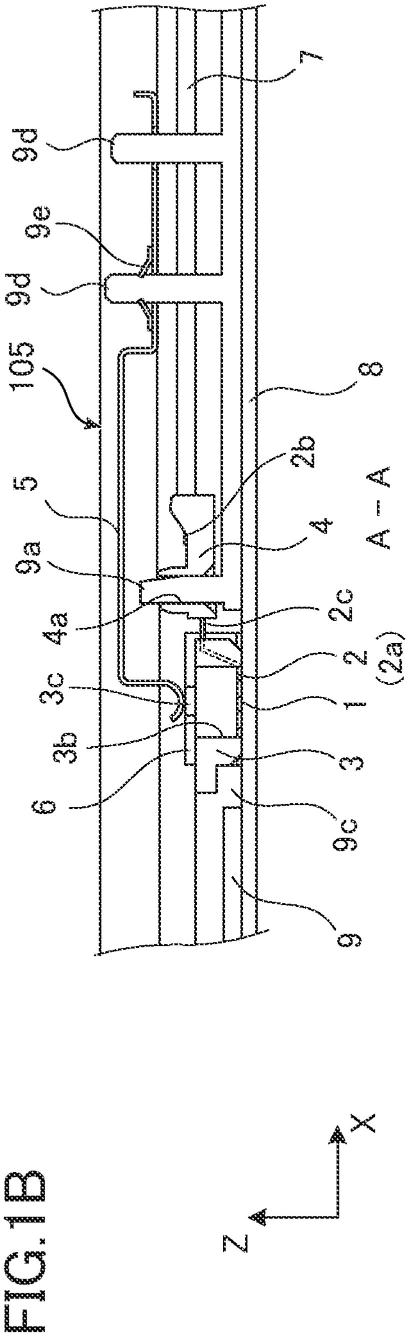
FIG. 1B is a cross-sectional view of the temperature detection device of the first embodiment.
Figure 2:
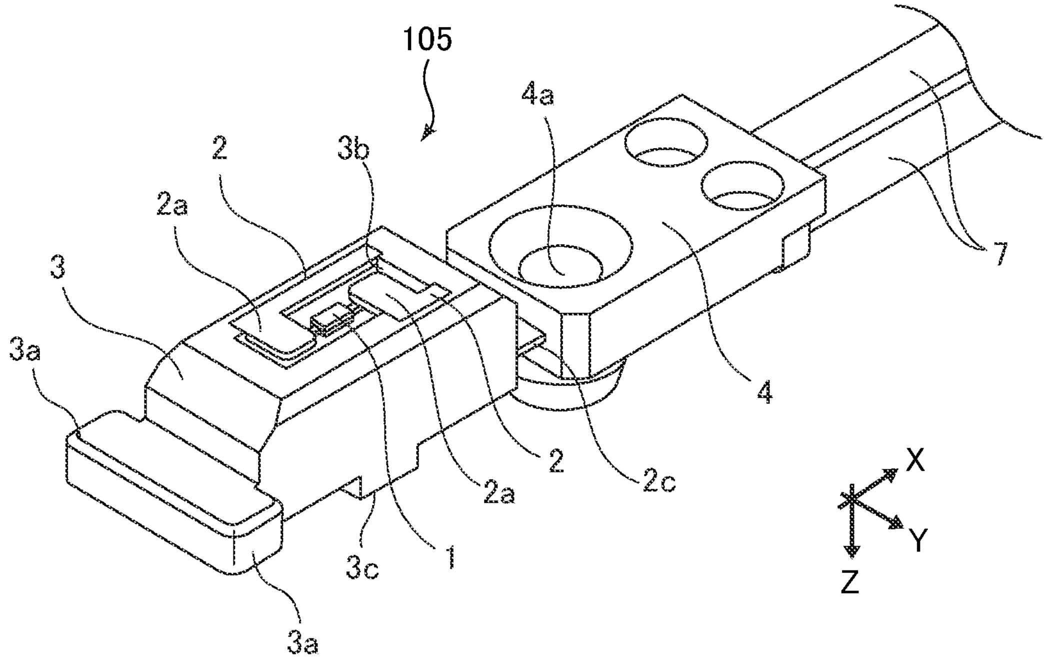
FIG. 2 is a perspective view of the temperature detection device of the first embodiment.

FIG. 1A is a plan view of a temperature detection device 105 of the first embodiment. FIG. 1B is a cross-sectional view of the temperature detection device 105, taken along a line A-A of FIG. 1A. FIG. 2 is a perspective view of the temperature detection device 105 of the first embodiment.

As illustrated in FIGS. 1A and 1B, and FIG. 2, the temperature detection device 105 includes a detection element 1, metal plates 2, a head portion 3, a base portion 4, an urging member 5, a heat-resistant coating 6, and harnesses 7.

The detection element 1 is an element that converts the temperature of a measurement object (that is an object to be measured, and is the heater 8 in the present embodiment) to an electric signal. For example, a thermistor, a resistance temperature detector, a thermocouple, or a thermopile can be used as the detection element 1, in accordance with the measurement temperature range or the aim of temperature detection, such as temperature control or abnormal-state detection. In the present embodiment, a thin-film thermistor is used as the detection element 1. The resistance value of the thin-film thermistor changes in accordance with the temperature of the heater 8. The metal plates 2 are made of a heat-resistant flexible material, such as a metal material. For example, stainless-steel plates can be suitably used as the metal plates 2. The head portion 3 and the base portion 4 are made of a resin material, such as liquid crystal polymer (LCP), that has sufficient heat resistance property to the heat from the heater 8.

The metal plates 2 are, for example, flexible members having flexibility. In the present embodiment, two metal plates 2 are disposed, electrically isolated from each other. The metal plates 2 are integrated with (or integrally molded with) the head portion 3 and the base portion 4 by means of insert molding. That is, the metal plates 2, the head portion 3, and the base portion 4 are an integrally-molded product, which is constituted by different types of material.

The metal plates 2 are plate-like members that are narrow and elongated in a direction that intersects the Z direction (i.e., the third direction), in which the detection element 1 and the heater 8 face each other. The metal plates 2 of the present embodiment are narrow and elongated in the X direction, which is the longitudinal direction of the heater 8. One end portion (on the −X direction side) of the metal plates 2 project into the interior of an opening portion 3*b* (FIG. 2) of the head portion 3, and the other end portion of the metal plates 2 are supported by the base portion 4. That is, the metal plates 2 that serves as flexible members hold the head portion 3, which serves as a first holding member, on a first edge side in the X direction (first direction); and are held by the base portion 4, which serves as a second holding member, on a second edge side in the X direction. In other words, a flexible member is configured to support the first holding member on a first end portion of the flexible member in the first direction, and the second holding member is configured to hold a second end portion of the flexible member in the first direction. Since the metal plates 2 bend or flex, the head portion 3 (the detection element 1) and the base portion 4 are movable relative to each other in the Z direction.

The head portion 3 is a member formed like a nearly rectangular cylinder that is opened in the Z direction. The detection element 1 is disposed inside the opening portion 3*b* of the head portion 3, at a position of an end portion of the head portion 3 on the −Z direction side. That is, the detection element 1 is held by the head portion 3, which serves as a first holding member. The detection element 1 is fixed to end portions 2*a* of the two metal plates 2, which project into the interior of the opening portion 3*b*, by using the resistance welding or the laser welding. Specifically, one terminal of the detection element 1 is supported by a first metal plate 2, and the other terminal of the detection element 1 is supported by a second metal plate 2. That is, the detection element 1 is supported by the metal plates 2, which serve as flexible members.

The head portion 3 includes the positioning projections 3*a*, which engage with the two positioning walls 9*b* formed in the heater holder 9. The positioning walls 9*b* are wall surfaces that face each other in the Y direction. The distance between the positioning walls 9*b* in the Y direction is set nearly equal to the distance between the positioning projections 3*a* of the head portion 3 in the Y direction.

The base portion 4 functions as a support portion that supports the flexible members. The base portion 4 includes a positioning hole portion 4*a* that serves as a positioning portion. The positioning hole portion 4*a* is an opening portion that fits on a positioning projection 9*a* formed on the heater holder 9. In the example illustrated in the figures, the positioning projection 9*a* is a nearly-cylindrical (shaft-like) protruding portion that extends or protrudes in the Z direction, and the positioning hole portion 4*a* is a cylindrical hole that passes through the base portion 4 in the Z direction.

At an end portion of the base portion 4 in the +X direction, the other end portions 2*b* of the metal plates 2 are exposed. The harnesses 7 are connected to the exposed end portions 2*b* of the metal plates 2. The two harnesses 7 are led toward the +X direction, and connected to an electric circuit of the image forming apparatus body. That is, the flexible members of the present embodiment include a first member (i.e., one metal plate 2) and a second member (i.e., the other metal plate 2). The first member electrically connects a first electric wire (i.e., one harness 7) and one terminal of the detection element 1, and the second member electrically connects a second electric wire (i.e., the other harness 7) and the other terminal of the detection element 1. In this manner, the temperature detection device 105 is electrically connected with the control portion 150, and an electric signal outputted from the detection element 1 is transmitted to the control portion 150 via the harnesses 7.

That is, the metal plates 2 not only support the detection element 1, but also constitute one part of the conduction path (electric circuit) for taking out the electric signal from the detection element 1.

Note that in the present embodiment, since the head portion 3 and the base portion 4 are members separated from each other, and connected with each other via the flexible metal plates 2, it is possible to reduce the possibility that an excessive amount of force is applied to the head portion 3 when the harnesses 7 are disposed. That is, even if the force is applied to the temperature detection device 105 when the harnesses 7 are disposed, the force is hardly applied to the head portion 3 because the force is received by the positioning hole portion 4*a* and the positioning projection 9*a* that fit with each other.

The urging member 5 abuts against an abutment portion 3*c* formed at an end portion of the head portion 3 on the +Z direction side, and urges the head portion 3 toward the −Z direction. The urging member 5 includes hole portions that fit on spring attachment portions (projections) 9*d* formed on the heater holder 9, and is fixed to the heater holder 9 via a fixing component 9*e*. The urging member 5 is a plate spring whose end portion extending from the spring attachment portions 9*d* toward the −X direction abuts against the head portion 3 and presses the head portion 3 toward the heater 8. Note that the urging member 5 is not illustrated in FIG. 1A. The urging member 5 is one example of an urging member (i.e., a positioning mechanism) that positions the detection element 1 with respect to the heater (measurement object) 8 in the Z direction (third direction). Instead of the urging member 5 that is a plate spring, another mechanism, such as a clip or a snap-fit, may be used for urging (positioning) the detection element 1 so that the detection element 1 is not separated from the heater 8 in the Z direction.

The heat-resistant coating 6 is disposed for ensuring a sufficient electric withstand voltage and protecting the detection element 1. The heat-resistant coating 6 covers a lower surface of the metal plates 2 that support the detection element 1, and most of the head portion 3. That is, the heat-resistant coating 6 protects the detection element 1 and the metal plates 2. Note that the heat-resistant coating 6 is not illustrated in the perspective view of FIG. 2.

For attaching the temperature detection device 105 to the heater holder 9, the positioning hole portion 4*a* of the base portion 4 is forced to fit on the positioning projection 9*a* of the heater holder 9. With this operation, the base portion 4 is positioned with respect to the heater holder 9 in the X direction (first direction) and the Y direction (second direction). Specifically, the base portion 4 is positioned with respect to the axis of the positioning projection 9*a* in the X direction and the Y direction. That is, the base portion 4 is positioned with respect to the heater holder 9, which serves as a holding member that holds the temperature detection device 105, in the directions that intersect the Z direction (third direction). In addition, by the positioning projections 3*a* of the head portion 3 engaging with the positioning walls 9*b* of the heater holder 9, the base portion 4 is prevented from rotating on the positioning projection 9*a*.

In a state where the temperature detection device 105 is positioned, the detection element 1 is exposed to the interior of the hole portion 9*c* of the heater holder 9 when viewed from the −Z direction. In addition, by the urging force of the urging member 5 urging the head portion toward the −Z direction, the detection element 1 is positioned with respect to the heater 8 in the Z direction.

On the other hand, since the positioning hole portion 4*a* can slide on the positioning projection 9*a* in the Z direction, the base portion 4 can move (or can be displaced) with respect to the heater holder 9, which serves as a holding member, in the Z direction (third direction).

Note that instead of the configuration of the present embodiment, a positioning projection (protruding portion) that extends in the Z direction may be disposed on the base portion 4, and a positioning hole portion that serves as an opening portion may be formed in the holding member (the heater holder 9). In addition, the opening portion may have a hole shape (concave shape) that does not pass through the base portion 4 or the heater holder 9.

Figure 4A:
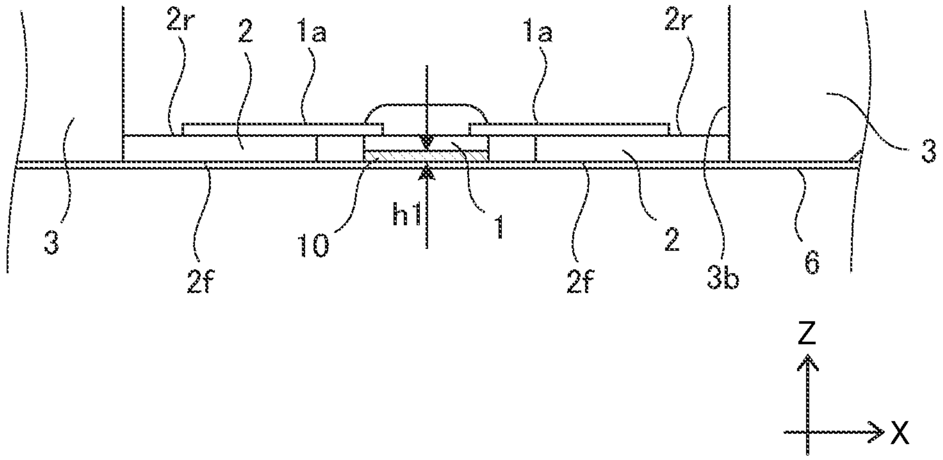
FIG. 4A is a diagram illustrating a positional relationship between a detection element and a measurement object in the first embodiment.
Figure 4B:
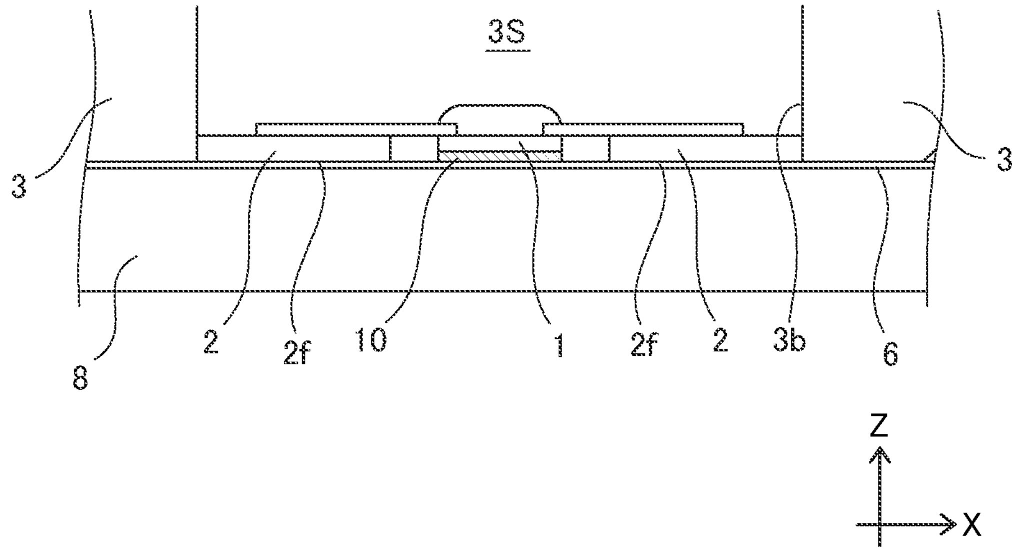
FIG. 4B is a diagram illustrating a positional relationship between the detection element and the measurement object in the first embodiment.

FIGS. 4A and 4B illustrate surroundings of the detection element 1 of the first embodiment. FIG. 4A illustrates a state before the temperature detection device 105 is assembled to the fixing apparatus (that is, a state before the attachment of the temperature detection device 105 is completed). FIG. 4B illustrates a state after the temperature detection device 105 is assembled to the fixing apparatus (that is, a state after the attachment of the temperature detection device 105 is completed).

As illustrated in FIG. 4A, terminals 1*a* of the detection element 1 are fixed to back surfaces 2*r* of the metal plates 2 on the +Z direction side (opposite to the measurement object). Front surfaces 2*f* of the metal plates 2 on the −Z direction side (i.e., the measurement object side) are facing surfaces that face the measurement object. The detection element 1 is disposed at a position that is retracted from the front surfaces 2*f* of the metal plates 2 toward the +Z direction, by a predetermined height h1 (the front surfaces 2*f* are heat-sensitive surfaces). The clearance having the height h1 and formed between the detection element 1 and the heat-resistant coating 6 is filled with thermally-conductive adhesive 10.

That is, around the detection element 1, a surface of the temperature detection device 105 on the −Z direction side is made flush so that the surface of the detection element 1 is flush with the front surfaces 2*f* of the metal plates 2. Note that the distance (i.e., the height h1) by which the detection element 1 is retracted from the heat-sensitive surface is set such that the detection element 1 does not project from the heat-sensitive surface toward the −Z direction due to the tolerance of components or the like. In addition, an end surface of the head portion 3 on the −Z direction side may also be flush with the front surfaces 2*f* of the metal plates 2.

As illustrated in FIG. 4B, when the temperature detection device 105 is assembled to the fixing apparatus, the head portion 3 is urged toward the −Z direction by the urging force of the urging member 5, and is pressed against the heater 8, which is a measurement object. While the head portion 3 is pressed against the heater 8, the detection element 1 is in contact with (or disposed adjacent to) the heater 8 via the adhesive 10 and the heat-resistant coating 6. That is, the detection element 1 is positioned at a position separated from the heater 8 in the Z direction, by the height h1 of the adhesive 10 and the thickness of the heat-resistant coating 6.

Advantage of First Embodiment

In the present embodiment, the base portion 4 is positioned by the positioning hole portion (positioning portion) 4*a* of the base portion 4, in the directions (i.e., the X and Y directions that are first and second directions) that intersect the Z direction. In addition, the detection element 1 is positioned with respect to the measurement object by the urging force of the urging member 5, in the Z direction (third direction). In this configuration, since the detection element 1 is supported by the flexible metal plates (flexible members) 2 supported by the base portion 4, and the positioning hole portion 4*a* allows the base portion 4 to move in the Z direction, the detection element 1 can be more stably positioned with respect to the measurement object.

Figure 3A:
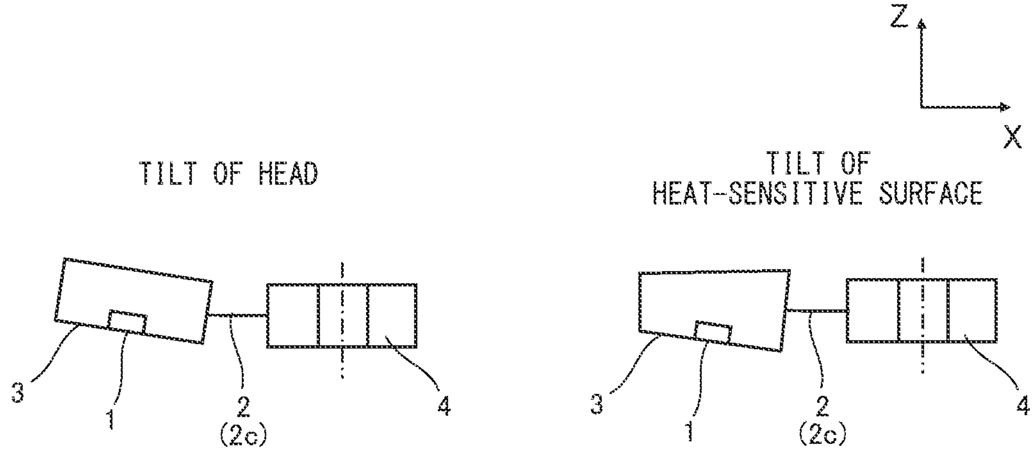
FIG. 3A is a schematic diagram for illustrating an effect of the temperature detection device of the first embodiment.

For example, as illustrated in FIG. 3A, there are cases where the head portion 3 is tilted and has an angle with respect to the base portion 4, and where the heat-sensitive surface of the head portion 3 has a shape tilted with respect to the base portion 4, due to the tolerance of components or the like. Specifically, the head portion 3 or the heat-sensitive surface of the head portion 3 is tilted with respect to a plane perpendicular to the axis (indicated by a broken line) of the positioning projection 9*a*.

Figure 3B:
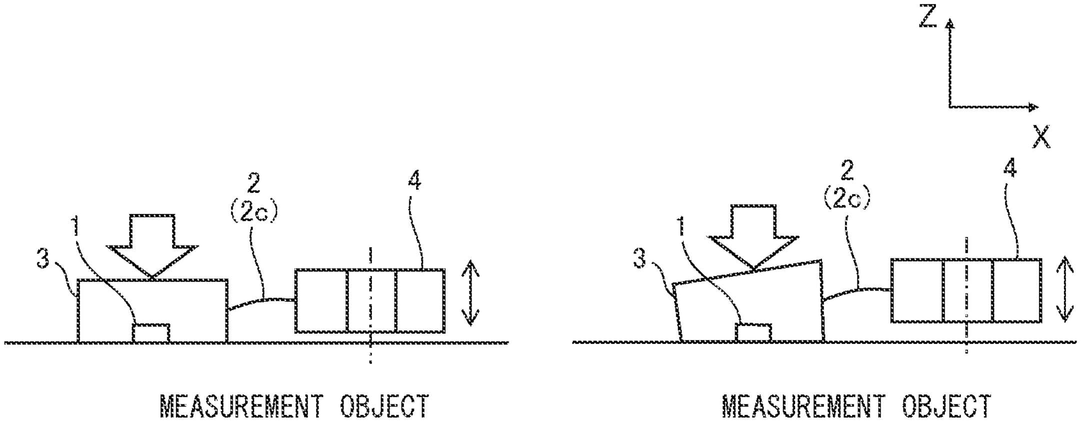
FIG. 3B is a schematic diagram for illustrating an effect of the temperature detection device of the first embodiment.

Even in the case where the head portion 3 or the heat-sensitive surface of the head portion 3 is tilted as described above, when the temperature detection device 105 is assembled to the fixing apparatus, the head portion 3 is rotated by the urging force of the urging member 5 such that the heat-sensitive surface of the head portion 3 is disposed along the surface of the heater 8. When the head portion 3 is rotated, the base portion 4 can move toward a direction which allows the stress applied to the metal plates 2 to be reduced, because the base portion 4 can move with respect to the heater holder 9 in the Z direction. That is, since the base portion 4 moves in the Z direction while positioned with respect to the heater holder 9 in the X and Y directions, the tilt of the heat-sensitive surface is easily corrected (equalized) by the rotation of the head portion 3. Since the tilt of the heat-sensitive surface is corrected, the temperature of the heater 8 can be detected with higher accuracy by using the detection element 1. Note that even if the heat-sensitive surface of the head portion 3 is tilted toward a direction different from the direction illustrated in FIG. 3A, the tilt of the heat-sensitive surface can be corrected by the metal plates 2 being bent (the metal plates 2 are flexible members). In this case, the moving direction or the amount of movement of the base portion 4 may be different from those illustrated in FIG. 3B.

That is, in the present embodiment, the positional accuracy of the detection element to the measurement object can be increased in a simple configuration.

Note that in the present embodiment, the metal plates 2 include an intermediate portion 2*c* (see FIGS. 1A, 1B, and 2) that extends between the base portion 4 and the head portion 3 in the X direction (first direction). The intermediate portion 2*c* is shaped like a plate whose thickness direction is the Z direction. Thus, the intermediate portion 2*c* of the metal plates 2 is mainly bent, so that the tilt of the heat-sensitive surface can be easily corrected.

In the comparative embodiment, the detection element is fixed to the heat-resistant elastic member 32 that is an elastomer. In the present embodiment, however, the detection element is not fixed to the heat-resistant elastic member 32, but fixed to the metal plates 2 that are flexible members. Thus, the positional accuracy of the detection element 1 to the heater 8 can be more easily ensured.

In addition, since the metal plates 2 are exposed, as a heat-sensitive surface, so as to surround the detection element 1, the heat collection effect for collecting heat from the measurement object increases, increasing the thermal responsiveness. Note that in the present embodiment, the area of the front surface 2*f* (i.e., a facing surface that is in contact with the measurement object via the heat-resistant coating 6) of the metal plates 2, which serve as a heat-sensitive surface, is larger than the area of the detection element 1 viewed in the Z direction. Thus, the heat collection effect is made larger.

In addition, in the present embodiment, the back surface of the detection element 1 (i.e., a surface of the detection element 1 on the +Z direction side that is opposite to the heater 8) is exposed to an internal space 3*s* of the opening portion 3*b* of the head portion 3. Thus, the back surface of the detection element 1 is not in contact with other members (FIG. 4B). Thus, less heat is radiated from the detection element 1 due to the heat insulating effect of the air of the space 3*s*, than the heat radiated in the configuration of the comparative embodiment in which the heat-resistant elastic member 32 having a thermal capacity larger than that of the air is disposed on the back surface of the detection element 1. As a result, the present embodiment can increase the thermal responsiveness.

Note that although the plate spring is used, as an example, as the urging member 5 in the present embodiment, another spring member, such as a coil spring or a wire spring, or an elastic member (elastomer) may be used. Even in a case where the elastic member is used, since the head portion 3 is interposed between the elastic member and the heater 8, less heat-resistance property is required than that of the heat-resistant elastic member 32 of the comparative embodiment. Thus, a less expensive material can be used.

In addition, the flexible members may not be in contact with the detection element 1, and the detection element 1 may be supported by the flexible members via the head portion 3. In this case, a circuit, other than the flexible members, for transmitting the signal outputted from the detection element 1 is disposed. For example, the terminals of the detection element 1 may be connected to the harnesses 7 via Dumet wires or the like.

Second Embodiment

Next, a temperature detection device of a second embodiment will be described with reference to FIGS. 5A and 5B. In the following description, a component having substantially the same structure and effect as those of a component of the first embodiment is given the same symbol as that of the component of the first embodiment, and the description thereof will be omitted.

Figure 5A:
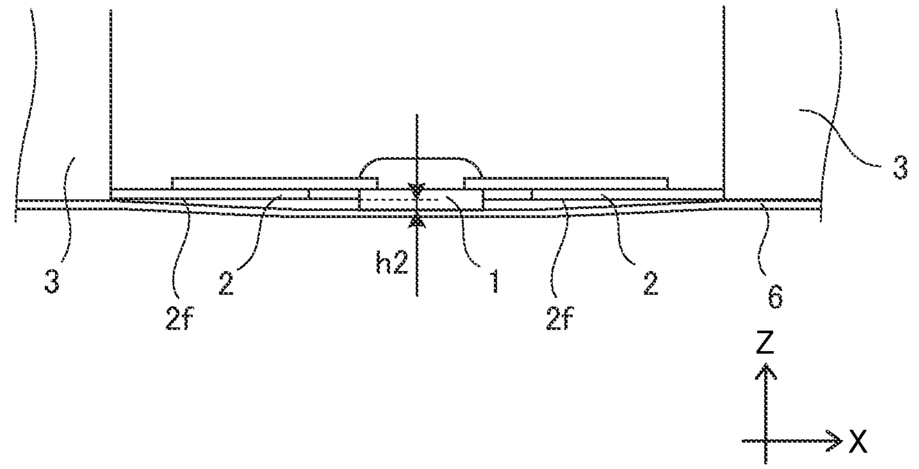
FIG. 5A is a diagram illustrating a positional relationship between a detection element and a measurement object in a second embodiment.
Figure 5B:
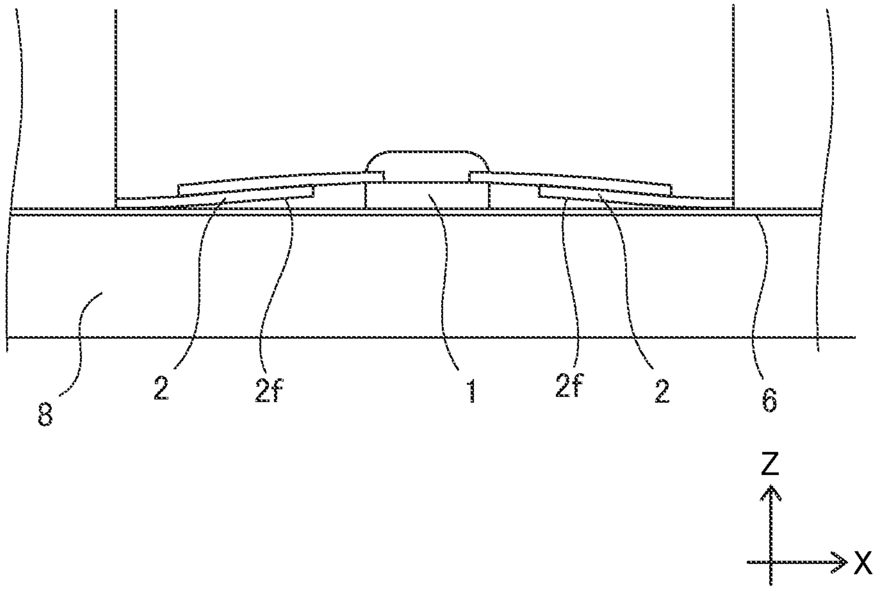
FIG. 5B is a diagram illustrating a positional relationship between the detection element and the measurement object in the second embodiment.

FIGS. 5A and 5B illustrate surroundings of a detection element 1 of the second embodiment. FIG. 5A illustrates a state before the temperature detection device 105 is assembled to the fixing apparatus 100 (that is, a state before the attachment of the temperature detection device 105 is completed). FIG. 5B illustrates a state after the temperature detection device 105 is assembled to the fixing apparatus (that is, a state after the attachment of the temperature detection device 105 is completed).

As illustrated in FIG. 5A, in the state before the temperature detection device 105 is assembled to the fixing apparatus, the detection element 1 is positioned at a position (i.e., a first position) located closer to the −Z direction side (i.e., the measurement object side) by a predetermined height h2, than the front surface 2*f* of the metal plates 2 that is located in a heat-sensing plane is. The state before the temperature detection device 105 is assembled to the fixing apparatus is a state before a unit constituted by the detection element 1, the metal plates 2, the head portion 3, and the base portion 4 is attached to the heater holder 9.

As illustrated in FIG. 5B, when the temperature detection device 105 is assembled to the fixing apparatus 100, the head portion 3 is urged toward the −Z direction by the urging force of the urging member 5, and is pressed against the heater 8, which is a measurement object. When the head portion 3 is urged and pressed against the heater 8, the metal plates 2 are bent, and the detection element 1 is retracted to the heat-sensing plane in the +Z direction. That is, in the present embodiment, the surface of the detection element 1 is made flush with the heat-sensing plane by using the bend (flex, elastic deformation) of the metal plates 2.

Note that the distance (i.e., the height h2) by which the detection element 1 projects from the heat-sensing plane is set such that the detection element 1 is not retracted from the heat-sensing plane toward the +Z direction due to the tolerance of components or the like. In addition, the urging force of the urging member 5 is set so as to be larger than the force necessary for bending the metal plates 2.

Also in the present embodiment, since the base portion 4 moves in the Z direction while positioned with respect to the heater holder 9 in the X and Y directions, the tilt of the heat-sensitive surface is easily corrected (equalized). Since the tilt of the heat-sensitive surface is corrected, the temperature of the heater 8 can be detected with higher accuracy by using the detection element 1.

That is, also in the present embodiment, the positional accuracy of the detection element to the measurement object can be increased in a simple configuration.

Third Embodiment

Next, a temperature detection device of a third embodiment will be described. In the following description, a component having substantially the same structure and effect as those of a component of the first embodiment is given the same symbol as that of the component of the first embodiment, and the description thereof will be omitted.

Figure 6A:
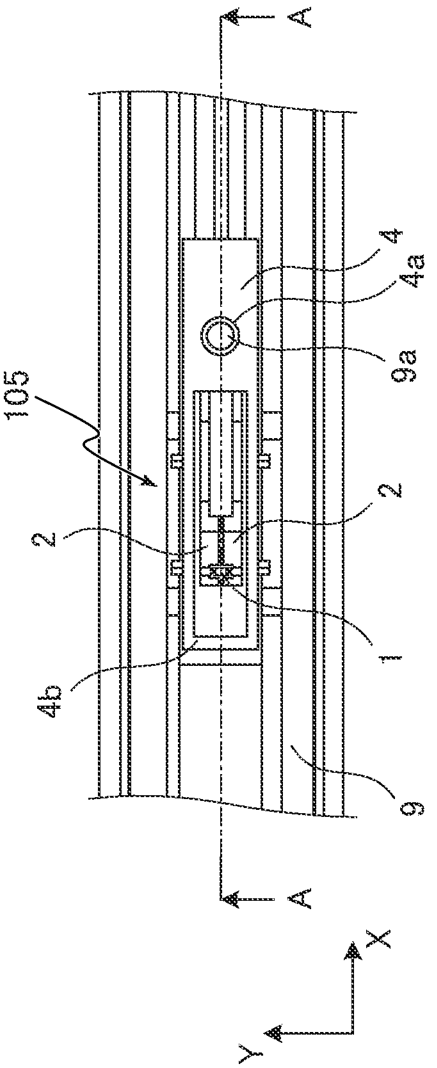
FIG. 6A is a plan view of a temperature detection device of a third embodiment.
Figure 6B:
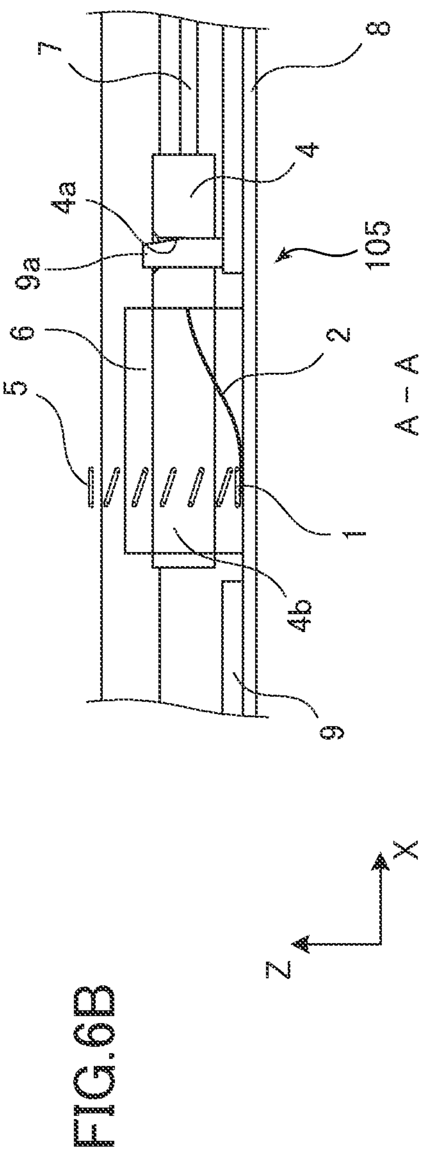
FIG. 6B is a cross-sectional view of the temperature detection device of the third embodiment.
Figure 7:
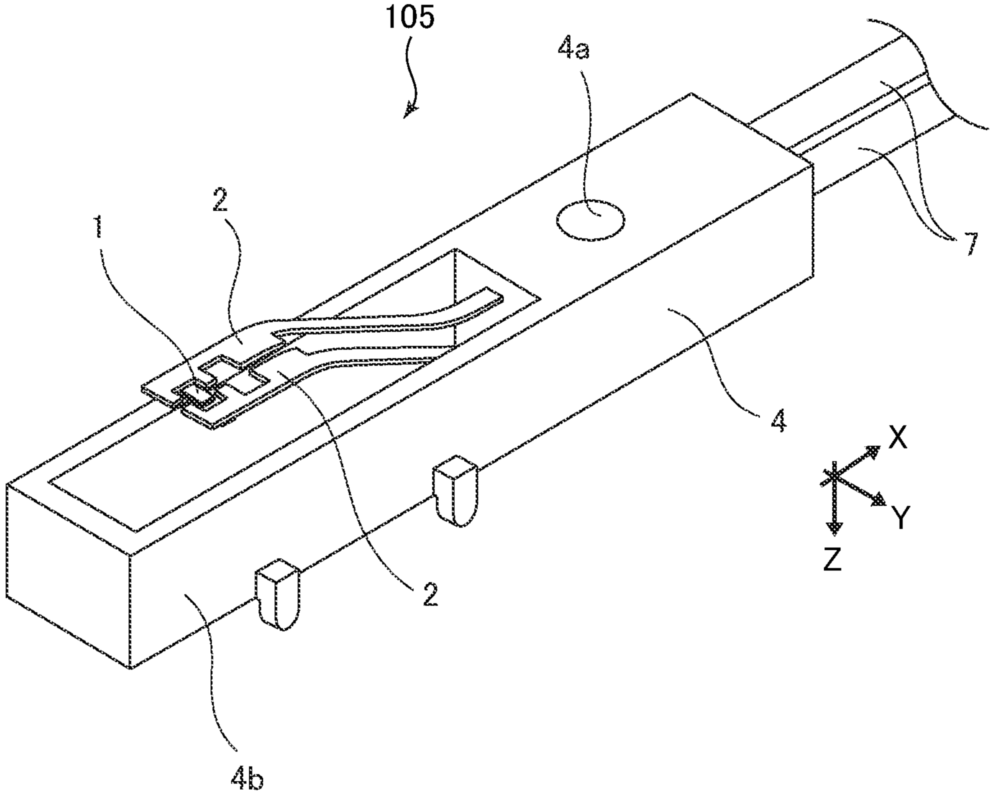
FIG. 7 is a perspective view of the temperature detection device of the third embodiment.

FIG. 6A is a plan view of a temperature detection device 105 of the third embodiment. FIG. 6B is a cross-sectional view of the temperature detection device 105, taken along a line A-A of FIG. 6A. FIG. 7 is a perspective view of the temperature detection device 105 of the third embodiment.

As illustrated in FIGS. 6A and 6B, and FIG. 7, the temperature detection device 105 includes a detection element 1, metal plates 2, a base portion 4, an urging member 5, a heat-resistant coating 6, and harnesses 7.

In the present embodiment, the head portion 3 that receives the urging force of the urging member 5 is not disposed, and the urging member 5 directly presses the metal plates 2. The urging member 5 is a coil spring whose end portion on the +Z direction side is supported by a fixing member (not illustrated), and whose end portion on the −Z direction side is in contact with the back surface 2*r* of the metal plates 2. In other words, the urging member of the present embodiment is a spring member that is in contact with a surface (i.e., the back surface 2*r*) of the flexible members opposite to the measurement object in the third direction. Since the metal plates 2 can be displaced (deformed) by the load applied by the urging member 5, the metal plates 2 allow the detection element 1 to be stably in contact with the heater 8.

As in the first embodiment, the metal plates 2 and the base portion 4 can be molded integrally with each other by means of the insert molding or the like. As in the first embodiment, the metal plates 2 include a first member (i.e., one metal plate 2) and a second member (i.e., the other metal plate 2). The first member electrically connects a first electric wire (i.e., one harness 7) and one terminal of the detection element 1, and the second member electrically connects a second electric wire (i.e., the other harness 7) and the other terminal of the detection element 1.

Note that a protection portion 4*b* is formed in the base portion 4 for protecting the detection element 1 and the metal plates 2. The protection portion 4*b* includes three wall surfaces disposed so as to surround the end portion (first end portion opposite to second end portion held by the base portion) of the metal plates 2 and the detection element 1, when viewed in the Z direction, on the −X direction side, the +Y direction side, and the −Y direction side. At least one portion of the urging member 5 is located inside the internal space of the protection portion 4*b*. In addition, as illustrated in FIG. 7, the metal plates 2 are curved such that in a state before the temperature detection device 105 is attached to the heater holder 9, the detection element 1 is located closer to the −Z direction side than an end surface of the protection portion 4*b* on the −Z direction side (i.e., the heater 8 side) is. In this manner, the detection element 1 can be more reliably be in contact with the heater 8, as illustrated in FIG. 6B.

The protection portion 4*b*, together with the detection element 1, is covered with an insulating film that serves as the heat-resistant coating 6. Note that the heat-resistant coating 6 is not illustrated in the perspective view of FIG. 7.

Also in the present embodiment, since the base portion 4 moves in the Z direction while positioned with respect to the heater holder 9 in the X and Y directions, the tilt of the heat-sensitive surface is easily corrected (equalized). Since the tilt of the heat-sensitive surface is corrected, the temperature of the heater 8 can be detected with higher accuracy by using the detection element 1.

That is, also in the present embodiment, the positional accuracy of the detection element to the measurement object can be increased in a simple configuration.

Fourth Embodiment

Next, a temperature detection device of a fourth embodiment will be described. In the following description, a component having substantially the same structure and effect as those of a component of the first embodiment is given the same symbol as that of the component of the first embodiment, and the description thereof will be omitted.

Figure 12A:
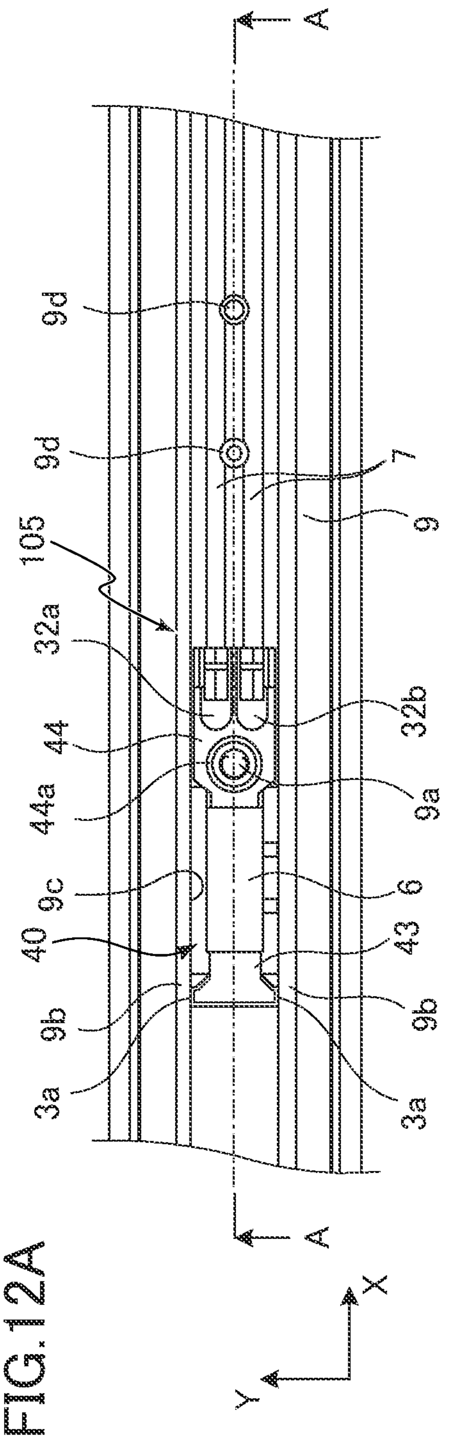
FIG. 12A is a plan view of a temperature detection device of a fourth embodiment.
Figure 12B:
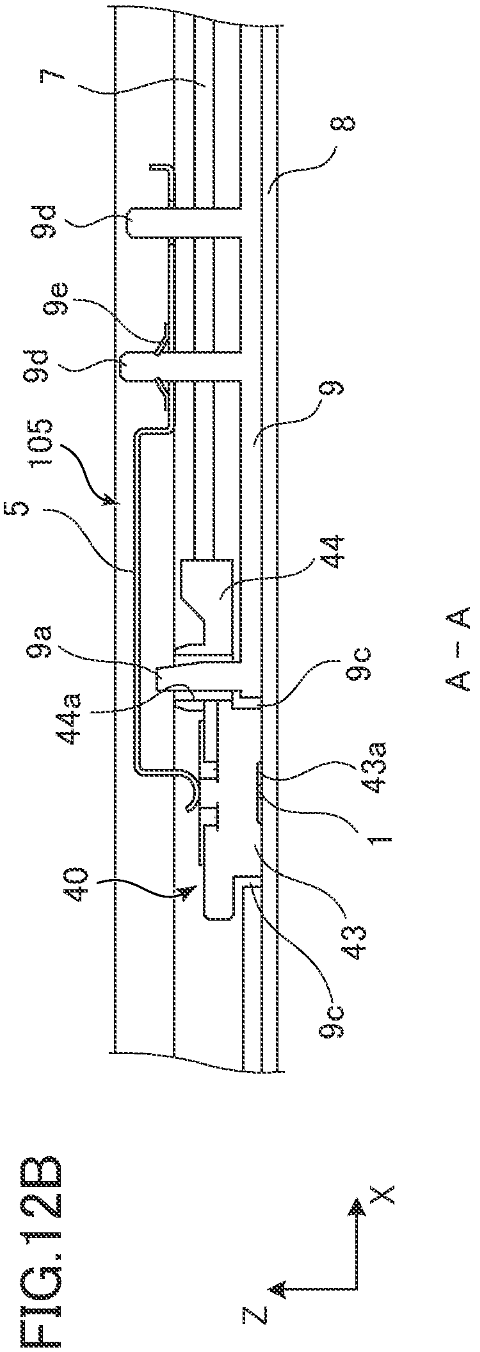
FIG. 12B is a cross-sectional view of the temperature detection device of the fourth embodiment.
Figure 13:
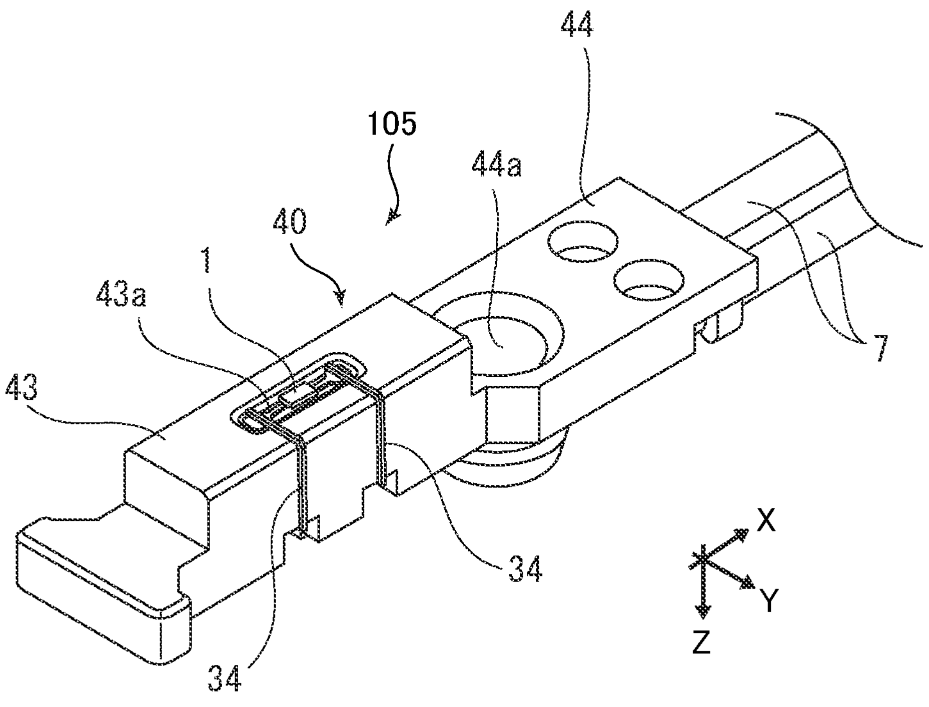
FIG. 13 is a perspective view of the temperature detection device of the fourth embodiment.

FIG. 12A is a plan view of a temperature detection device 105 of the fourth embodiment. FIG. 12B is a cross-sectional view of the temperature detection device 105, taken along a line A-A of FIG. 12A. FIG. 13 is a perspective view of the temperature detection device 105 of the fourth embodiment.

As illustrated in FIGS. 12A and 12B, and FIG. 13, the temperature detection device 105 includes a detection element 1, a detection element holder 40, an urging member 5, a heat-resistant coating 6, and harnesses 7.

In the present embodiment, the detection element holder 40, which serves as a holding member that holds the detection element 1, is a member into which a portion corresponding to the head portion 3 of the first embodiment and a portion corresponding to the base portion 4 of the same are integrated with each other. That is, the detection element holder 40 includes a head portion 43 (first portion) that serves as a holding portion that holds the detection element 1, and a base portion 44 (second portion) that includes a positioning portion that positions the base portion 44 with respect to the heater holder 9; and is a member into which the head portion 43 and the base portion 44 are integrated with each other, and in which the head portion 43 and the base portion 44 are continuously formed.

The base portion 44 includes a positioning hole portion 44*a* that serves as the positioning portion. The positioning hole portion 44*a* is forced to fit on a positioning projection 9*a* that serves as a protruding portion of the heater holder 9. With this operation, the base portion 44 is positioned with respect to the heater holder 9 in the X and Y directions. Specifically, the base portion 4 is positioned with respect to the axis of the positioning projection 9*a* in the X and Y directions.

The urging member 5 urges the head portion 43 of the detection element holder 40 toward the heater 8 in the Z direction. The detection element 1 is brought into pressure contact with the heater 8 by the urging force of the urging member 5. Note that in the present embodiment, as in the above-described comparative embodiment (FIG. 11), the detection element 1 can be connected to the harnesses 7 via two Dumet wires 34 and stainless-steel plates 32*a* and 32*b*.

In the present embodiment, a clearance or gap is formed between the positioning hole portion 44*a*, which serves as a positioning portion formed in the detection element holder 40, and a portion of the heater holder 9 (i.e., the positioning projection 9*a*), which engages with the positioning hole portion 44*a*. The clearance allows the detection element holder 40 to change its posture. That is, in a state where the positioning portion engages with the heater holder, the holding member of the present embodiment can be tilted such that the holding portion moves in the third direction. Specifically, the holding member can be tilted due to the clearance (i.e., is allowed to tilt by the clearance) formed between the positioning portion and the portion of the heater holder, which engages with the positioning portion.

Since the clearance (gap) is formed in this manner, the detection element 1 can reliably be in contact with the heater 8 even if a holding surface 43*a* (i.e., a seating surface of the detection element 1 for fixing the detection element 1 to the heater 8) of the detection element 1 of the head portion 43 is tilted with respect to the heater 8, for example. That is, since the positioning hole portion 44*a* is tilted with respect to the positioning projection 9*a*, the detection element 1 can be pressed against the heater 8 by the urging force of the urging member 5. In other words, the tilt of the holding surface 43*a* of the detection element 1 can be corrected due to the clearance, within a range in which the detection element holder 40 can tilt (or can change its posture). As a result, the same advantage as that of the first embodiment can be produced. Note that a component against which the detection element 1 is pressed may be a heat equalizing member, as described below.

The present embodiment has an advantage that increases the positional accuracy of the detection element 1 to a certain extent, in a simple configuration that uses the detection element holder 40, which is integrally molded without including the flexible members such as the metal plates 2 of the first embodiment.

Modifications

In the above-described embodiments, the detection element 1 is directly in contact with the heater 8 via the adhesive 10 (FIG. 4A) and/or the heat-resistant coating 6 (FIG. 5). The present disclosure, however, is not limited to this. For example, the detection element 1 may be in contact with the heater 8 via a heat equalizing member. The heat equalizing member is made of a material having excellent thermal conductivity, and is disposed between the heater 8 and the detection element 1. The heat equalizing member may be a thin-plate member or a sheet-like member made of a material, such as metal, that has high thermal conductivity.

If the heat equalizing member is used, the detection signal from the detection element 1 represents a value that correlates with a temperature into which temperatures of a large portion of the heater 8 are averaged. Thus, the use of the heat equalizing member can increase the accuracy of detecting the temperature.

In the above-described embodiments, the description has been made, as an example, for the image forming apparatus that includes the direct-transfer process unit PU, which serves as an image forming portion. The present disclosure, however, is not limited to this. For example, the present disclosure may be applied to an image forming apparatus that includes an intermediate-transfer process unit. The intermediate-transfer process unit primary-transfers a toner image formed on an image bearing member, to an intermediate transfer member; and then, secondary-transfers the toner image from the intermediate transfer member to a recording material. In addition, the image forming portion may form a color image on a recording material by forming toner images on a plurality of image bearing members by using toners with different colors, and by superposing the toner images on the recording material.

In addition, in the above-described embodiments, the description has been made, as an example, for the film-heating fixing apparatus that uses the tubular film 101 as a fixing member, the pressing roller 102 as a pressing member, and the heater 8 that is a ceramic heater and serves as a heating portion. However, the fixing apparatus is not limited to this. For example, the fixing member may be a cylindrical roller. In addition, the heating portion is not limited to the ceramic heater. For example, the heating portion may use a halogen lamp that generates radiant heat, or an induction heating mechanism that causes a conductive layer of the fixing member to generate heat, by using induction heating.

The temperature detection device described in the embodiments and used for the fixing apparatus can be used as an apparatus that detects the temperature of a heater or a fixing member for controlling the temperature of a fixing apparatus, regardless of the system of the fixing apparatus. In addition, the temperature detection device may constitute an abnormal-state detection apparatus used for stopping the energization of the heater if the abnormal-state detection apparatus detects an abnormal state (such as overheat or abnormal temperature rise) of the fixing apparatus.

SUMMARY OF THE PRESENT DISCLOSURE

The present disclosure at least includes the following configurations.

(Configuration A1)

A fixing apparatus comprising:

- a heater including a heating member, a first direction being a longitudinal direction of a surface of the heater on which the heating member is disposed, a second direction being a widthwise direction of the surface of the heater;
- a heater holder configured to hold the heater;
- a detection element configured to detect a temperature of the heater and disposed at a position that faces the heater in a third direction, the third direction being a thickness direction of the heater orthogonal to both of the first direction and the second direction;
- a first holding member configured to hold the detection element;
- an urging member configured to urge the first holding member;
- a flexible member extending in the first direction and configured to support the first holding member on a first end portion of the flexible member in the first direction; and
- a second holding member configured to hold a second end portion of the flexible member in the first direction,
- wherein the flexible member is flexible such that the first holding member and the second holding member are movable relative to each other in the third direction,
- wherein the second holding member includes a positioning portion configured to engage with the heater holder and position the second holding member in the first direction and the second direction, and
- wherein the first holding member is urged by the urging member toward the heater in the third direction.

(Configuration A2)

The fixing apparatus according to Configuration A1, wherein the second holding member is movable in the third direction in a state where the second holding member is positioned by the positioning portion and the first holding member is urged by the urging member.

(Configuration A3)

The fixing apparatus according to Configuration A1 or A2, wherein the urging member is a spring member configured to urge the first holding member toward the heater.

(Configuration A4)

The fixing apparatus according to any one of Configurations A1 to A3, wherein the first holding member and the second holding member are made of resin material, and

- wherein the flexible member is made of metal material and integrated with the first holding member and the second holding member by means of insert molding.

(Configuration A5)

The fixing apparatus according to any one of Configurations A1 to A4, wherein the first holding member includes an opening portion that is opened in the third direction,

- wherein the detection element is disposed inside the opening portion, and
- wherein a surface of the detection element opposite to the heater in the third direction is not in contact with other members.

(Configuration A6)

The fixing apparatus according to any one of Configurations A1 to A5, wherein the flexible member includes an intermediate portion formed between the first holding member and the second holding member and extending in the first direction, and

- wherein the intermediate portion is formed like a plate whose thickness direction is the third direction.

(Configuration A7)

The fixing apparatus according to any one of Configurations A1 to A6, wherein the urging member is a spring member that is in contact with a surface of the flexible member opposite to the heater in the third direction.

(Configuration A8)

The fixing apparatus according to any one of Configurations A1 to A7, wherein the flexible member includes a facing surface configured to face the heater,

- wherein the detection element is positioned at a position that is separated more from the heater in the third direction than the facing surface is, and
- wherein a space between the detection element and the heater is filled with adhesive.

(Configuration A9)

The fixing apparatus according to any one of Configurations A1 to A8, wherein the flexible member includes a facing surface configured to face the heater, wherein in a state before attachment of a unit including the detection element, the flexible member, the first holding member, and the second holding member to the heater holder is completed, the detection element is located closer to the heater in the third direction than the facing surface is, and wherein in a state where the attachment of the unit to the heater holder is completed, the detection element is pressed against the heater by urging force of the urging member in a state in which the flexible member is elastically deformed.

(Configuration A10)

The fixing apparatus according to any one of Configurations A1 to A9, wherein the flexible member is configured to constitute one part of an electric circuit that transmits an electric signal outputted from the detection element.

(Configuration A11)

The fixing apparatus according to Configuration A10, wherein a first electric wire and a second electric wire are connected to the second holding member, and wherein the flexible member includes a first member configured to electrically connect the first electric wire and one terminal of the detection element, and a second member configured to electrically connect the second electric wire and another terminal of the detection element.

(Configuration A12)

The fixing apparatus according to any one of Configurations A1 to A11, wherein the flexible member is a stainless-steel plate member.

(Configuration A13)

The fixing apparatus according to any one of Configurations A1 to A12, wherein one of the heater holder and the positioning portion includes a protruding portion protruding in the third direction, and wherein another one of the heater holder and the positioning portion includes an opening portion configured to fit on the protruding portion.

(Configuration A14)

The fixing apparatus according to any one of Configurations A1 to A13, wherein a portion of the urging member on one side in the first direction is configured to urge the first holding member, and a portion of the urging member on another side in the first direction is fixed to the heater holder.

(Configuration A15)

The fixing apparatus according to any one of Configurations A1 to A14, wherein the detection element is abutted against the heater by urging force of the urging member.

(Configuration A16)

The fixing apparatus according to any one of Configurations A1 to A14, further comprising a heat equalizing member disposed between the detection element and the heater in the third direction and configured to equalize distribution of heat from the heater, wherein the detection element is abutted against the heat equalizing member by urging force of the urging member.

(Configuration A17)

The fixing apparatus according to any one of Configurations A1 to A16, further comprising:

a tubular film configured to be rotated; and a pressing member, wherein the heater and the heater holder are disposed in an internal space of the film, wherein the pressing member is disposed so as to face the heater with the film interposed between the heater and the pressing member, and wherein the fixing apparatus is configured to fix an image to a recording material such that the film heated by the heater heats the image on the recording material while the film and the pressing member nipping and conveying the recording material in a nip portion formed between the heater and the pressing member.

(Configuration A18)

An image forming apparatus comprising:

an image forming portion configured to form an image on a recording material; and the fixing apparatus according to any one of Configurations A1 to A11 and configured to fix, by heating the image formed by the image forming portion, the image to the recording material.

(Configuration A19)

A temperature detection device comprising:

a detection element including a surface that faces a measurement object and configured to detect a temperature of the measurement object, a first direction being a direction of a first side of the surface, a second direction being a direction of a second side of the surface orthogonal to the first side, a third direction being a direction orthogonal to both of the first direction and the second direction, the detection element being disposed so as to face the measurement object in the third direction;

a first holding member configured to hold the detection element;

an urging member configured to urge the first holding member;

a flexible member extending in the first direction and configured to support the first holding member on a first end portion of the flexible member in the first direction; and a second holding member configured to hold a second end portion of the flexible member in the first direction, wherein the flexible member is flexible such that the first holding member and the second holding member are movable relative to each other in the third direction, wherein the second holding member includes a positioning portion configured to position the second holding member in the first direction and the second direction, and wherein the first holding member is urged by the urging member toward the measurement object in the third direction.

(Configuration A20)

The temperature detection device according to Configuration A19, wherein the second holding member is movable in the third direction in a state where the second holding member is positioned by the positioning portion and the first holding member is urged by the urging member.

(Configuration A21)

The temperature detection device according to Configuration A19 or A20, wherein the urging member is a spring member configured to urge the first holding member toward the measurement object.

(Configuration A22)

The temperature detection device according to any one of Configurations A19 to A21, wherein the first holding member and the second holding member are made of resin material, and wherein the flexible member is made of metal material and integrated with the first holding member and the second holding member by means of insert molding.

(Configuration A23)

The temperature detection device according to any one of Configurations A19 to A22, wherein the first holding member includes an opening portion that is opened in the third direction, wherein the detection element is disposed inside the opening portion, and wherein a surface of the detection element opposite to the measurement object in the third direction is not in contact with other members.

(Configuration A24)

The temperature detection device according to any one of Configurations A19 to A23, wherein the flexible member includes an intermediate portion formed between the first holding member and the second holding member and extending in the first direction, and wherein the intermediate portion is formed like a plate whose thickness direction is the third direction.

(Configuration A25)

The temperature detection device according to any one of Configurations A19 to A24, wherein the urging member is a spring member that is in contact with a surface of the flexible member opposite to the measurement object in the third direction.

(Configuration A26)

The temperature detection device according to any one of Configurations A19 to A25, wherein the flexible member includes a facing surface configured to face the measurement object, wherein the detection element is positioned at a position that is separated more from the measurement object in the third direction than the facing surface is, and wherein a space between the detection element and the measurement object is filled with adhesive.

(Configuration A27)

The temperature detection device according to any one of Configurations A19 to A26, wherein the flexible member includes a facing surface configured to face the measurement object, wherein in a state before attachment of a unit including the detection element, the flexible member, the first holding member, and the second holding member to a holder configured to hold the unit is completed, the detection element is located closer to the measurement object in the third direction than the facing surface is, and wherein in a state where the attachment of the unit to the holder is completed, the detection element is pressed against the measurement object by urging force of the urging member in a state in which the flexible member is elastically deformed.

(Configuration A28)

The temperature detection device according to any one of Configurations A19 to A27, wherein the flexible member is configured to constitute one part of an electric circuit that transmits an electric signal outputted from the detection element.

(Configuration A29)

The temperature detection device according to Configuration A28, wherein the flexible member includes a first member configured to electrically connect a first electric wire of the electric circuit and one terminal of the detection element, and a second member configured to electrically connect a second electric wire of the electric circuit and another terminal of the detection element.

(Configuration A30)

The temperature detection device according to any one of Configurations A19 to A29, wherein the flexible member is a stainless-steel plate member.

(Configuration A31)

The temperature detection device according to any one of Configurations A19 to A30, wherein a portion of the urging member on one side in the first direction is configured to urge the first holding member, and a second end portion of the urging member on another side in the first direction is fixed to a member configured to position the positioning portion of the second holding member.

(Configuration A32)

The temperature detection device according to any one of Configurations A19 to A31, wherein the detection element is abutted against the measurement object by urging force of the urging member.

(Configuration A33)

The temperature detection device according to any one of Configurations A19 to A31, further comprising a heat equalizing member disposed between the detection element and the measurement object in the third direction and configured to equalize distribution of heat from the measurement object, wherein the detection element is abutted against the heat equalizing member by urging force of the urging member.

(Configuration B1)

A fixing apparatus comprising:

a heater including a heating member, a first direction being a longitudinal direction of a surface of the heater on which the heating member is disposed, a second direction being a widthwise direction of the surface of the heater;

a heater holder configured to hold the heater;

a detection element configured to detect a temperature of the heater and disposed at a position that faces the heater in a third direction, the third direction being a thickness direction of the heater orthogonal to both of the first direction and the second direction;

a flexible member extending in the first direction and configured to hold the detection element on a first end portion of the flexible member in the first direction;

an urging member configured to urge the first end portion of the flexible member; and a holding member configured to hold a second end portion of the flexible member in the first direction, wherein the flexible member is flexible such that the detection element and the holding member are movable relative to each other in the third direction, wherein the holding member includes a positioning portion configured to engage with the heater holder and position the holding member in the first direction and the second direction, and wherein the first end portion of the flexible member is urged by the urging member toward the heater in the third direction.

(Configuration B2)

The fixing apparatus according to Configuration B1, wherein the holding member is made of resin material, and wherein the flexible member is made of metal material.

(Configuration B3)

The fixing apparatus according to Configuration B2, wherein the flexible member is integrated with the holding member by means of insert molding.

(Configuration B4)

The fixing apparatus according to any one of Configurations B1 to B3, wherein the urging member is a spring member that is in contact with a surface of the flexible member opposite to the heater in the third direction.

(Configuration B5)

The fixing apparatus according to any one of Configurations B1 to B4, wherein the holding member includes a protection portion formed so as to surround the detection element when viewed in the third direction, and wherein in a state before attachment of the holding member to the heater holder is completed, the detection element is located closer to the heater in the third direction than an end surface of the protection portion that faces the heater is.

(Configuration B6)

The fixing apparatus according to any one of Configurations B1 to B5, wherein the flexible member is configured to constitute one part of an electric circuit that transmits an electric signal outputted from the detection element.

(Configuration B7)

The fixing apparatus according to Configuration B6, wherein the flexible member includes a first member configured to electrically connect a first electric wire of the electric circuit and one terminal of the detection element, and a second member configured to electrically connect a second electric wire of the electric circuit and another terminal of the detection element.

(Configuration B8)

The fixing apparatus according to any one of Configurations B1 to B7, wherein the flexible member is a stainless-steel plate member.

(Configuration B9)

The fixing apparatus according to any one of Configurations B1 to B8, wherein one of the heater holder and the positioning portion includes a protruding portion protruding in the third direction, and wherein another one of the heater holder and the positioning portion includes an opening portion configured to fit on the protruding portion.

(Configuration B10)

The fixing apparatus according to any one of Configurations B1 to B9, wherein the detection element is abutted against the heater by urging force of the urging member.

(Configuration B11)

The fixing apparatus according to any one of Configurations B1 to B9, further comprising a heat equalizing member disposed between the detection element and the heater in the third direction and configured to equalize distribution of heat from the heater, wherein the detection element is abutted against the heat equalizing member by urging force of the urging member.

(Configuration B12)

The fixing apparatus according to any one of Configurations B1 to B11, further comprising:

a tubular film configured to be rotated; and a pressing member, wherein the heater and the heater holder are disposed in an internal space of the film, wherein the pressing member is disposed so as to face the heater with the film interposed between the heater and the pressing member, and wherein the fixing apparatus is configured to fix an image to a recording material such that the film heated by the heater heats the image on the recording material while the film and the pressing member nipping and conveying the recording material in a nip portion formed between the heater and the pressing member.

(Configuration B13)

An image forming apparatus comprising:

an image forming portion configured to form an image on a recording material; and the fixing apparatus according to any one of Configurations B1 to B12 and configured to fix, by heating the image formed by the image forming portion, the image to the recording material.

(Configuration B14)

A temperature detection device comprising:

a detection element including a surface that faces a measurement object and configured to detect a temperature of the measurement object, a first direction being a direction of a first side of the surface, a second direction being a direction of a second side of the surface orthogonal to the first side, a third direction being a direction orthogonal to both of the first direction and the second direction, the detection element being disposed so as to face the measurement object in the third direction;

a flexible member extending in the first direction and configured to hold the detection element on a first end portion of the flexible member in the first direction;

an urging member configured to urge the first end portion of the flexible member; and a holding member configured to hold a second end portion of the flexible member in the first direction, wherein the flexible member is flexible such that the detection element and the holding member are movable relative to each other in the third direction, wherein the holding member includes a positioning portion configured to position the holding member in the first direction and the second direction, and wherein the first end portion of the flexible member is urged by the urging member toward the measurement object in the third direction.

(Configuration B15)

The temperature detection device according to Configuration B14, wherein the holding member is made of resin material, and wherein the flexible member is made of metal material.

(Configuration B16)

The temperature detection device according to Configuration B15, wherein the flexible member is integrated with the holding member by means of insert molding.

(Configuration B17)

The temperature detection device according to any one of Configurations B14 to B16, wherein the urging member is a spring member that is in contact with a surface of the flexible member opposite to the measurement object in the third direction.

(Configuration B18)

The temperature detection device according to any one of Configurations B14 to B17, wherein the holding member includes a protection portion formed so as to surround the detection element when viewed in the third direction, and wherein in a state before attachment of the holding member to a holder that holds the holding member is completed, the detection element is located closer to the measurement object in the third direction than an end surface of the protection portion that faces the measurement object is.

(Configuration B19)

The temperature detection device according to any one of Configurations B14 to B18, wherein the flexible member is configured to constitute one part of an electric circuit that transmits an electric signal outputted from the detection element.

(Configuration B20)

The temperature detection device according to Configuration B19, wherein the flexible member includes a first member configured to electrically connect a first electric wire of the electric circuit and one terminal of the detection element, and a second member configured to electrically connect a second electric wire of the electric circuit and another terminal of the detection element.

(Configuration B21)

The temperature detection device according to any one of Configurations B14 to B20, wherein the flexible member is a stainless-steel plate member.

(Configuration B22)

The temperature detection device according to any one of Configurations B14 to B21, wherein the detection element is abutted against the measurement object by urging force of the urging member.

(Configuration B23)

The temperature detection device according to any one of Configurations B14 to B21, further comprising a heat equalizing member disposed between the detection element and the measurement object in the third direction and configured to equalize distribution of heat from the measurement object, wherein the detection element is abutted against the heat equalizing member by urging force of the urging member.

(Configuration C1)

A fixing apparatus comprising:

a heater including a heating member, a first direction being a longitudinal direction of a surface of the heater on which the heating member is disposed, a second direction being a widthwise direction of the surface of the heater;

a heater holder configured to hold the heater;

a detection element configured to detect a temperature of the heater and disposed at a position that faces the heater in a third direction, the third direction being a thickness direction of the heater orthogonal to both of the first direction and the second direction;

a holding member configured to hold the detection element and including a holding surface provided in a first portion of the holding member in the first direction and a positioning portion provided in a second portion of the holding member in the first direction, the holding surface being configured to hold the detection element, the positioning portion being configured to engage with the heater holder; and an urging member configured to urge the holding member, wherein a clearance is provided between the positioning portion and a portion of the heater holder configured to engage with the positioning portion, wherein the holding member is allowed to tilt by the clearance such that the first portion of the holding member and the second portion of the holding member are movable relative to each other in the third direction, wherein the second portion of the holding member is positioned by the positioning portion in the first direction and the second direction, and wherein the first portion of the holding member is urged by the urging member toward the heater in the third direction.

(Configuration C2)

The fixing apparatus according to Configuration C1, wherein the positioning portion is movable in the third direction in a state where the second portion of the holding member is positioned and the first portion of the holding member is urged by the urging member.

(Configuration C3)

The fixing apparatus according to Configuration C1 or C2, wherein the urging member is a spring member configured to urge the first portion of the holding member toward the heater.

(Configuration C4)

The fixing apparatus according to any one of Configurations C1 to C3, wherein a portion of the urging member on one side in the first direction is configured to urge the holding member, and a portion of the urging member on another side in the first direction is fixed to the heater holder.

(Configuration C5)

The fixing apparatus according to any one of Configurations C1 to C4, wherein the detection element is abutted against the heater by urging force of the urging member.

(Configuration C6)

The fixing apparatus according to any one of Configurations C1 to C4, further comprising a heat equalizing member disposed between the detection element and the heater in the third direction and configured to equalize distribution of heat from the heater, wherein the detection element is abutted against the heat equalizing member by urging force of the urging member.

(Configuration C7)

The fixing apparatus according to any one of Configurations C1 to C6, further comprising:

a tubular film configured to be rotated; and a pressing member, wherein the heater and the heater holder are disposed in an internal space of the film, wherein the pressing member is disposed so as to face the heater with the film interposed between the heater and the pressing member, and wherein the fixing apparatus is configured to fix an image to a recording material such that the film heated by the heater heats the image on the recording material while the film and the pressing member nipping and conveying the recording material in a nip portion formed between the heater and the pressing member.

(Configuration C8)

An image forming apparatus comprising:

an image forming portion configured to form an image on a recording material; and the fixing apparatus according to any one of Configurations C1 to C7 and configured to fix, by heating the image formed by the image forming portion, the image to the recording material.

(Configuration C9)

A temperature detection device comprising:

a detection element including a surface that faces a measurement object and configured to detect a temperature of the measurement object, a first direction being a direction of a first side of the surface, a second direction being a direction of a second side of the surface orthogonal to the first side, a third direction being a direction orthogonal to both of the first direction and the second direction, the detection element being disposed so as to face the measurement object in the third direction;

a holding member configured to hold the detection element and including a holding surface provided in a first portion of the holding member in the first direction and a positioning portion provided in a second portion of the holding member in the first direction, the holding surface being configured to hold the detection element; and an urging member configured to urge the holding member, wherein the positioning portion is configured such that a clearance is provided between the positioning portion and a member configured to engage with the positioning portion, wherein the holding member is allowed to tilt by the clearance such that the first portion of the holding member and the second portion of the holding member are movable relative to each other in the third direction, wherein the second portion of the holding member is positioned by the positioning portion in the first direction and the second direction, and wherein the first portion of the holding member is urged by the urging member toward the measurement object in the third direction.

(Configuration C10)

The temperature detection device according to Configuration C9, wherein the positioning portion is movable in the third direction in a state where the second portion of the holding member is positioned and the first portion of the holding member is urged by the urging member.

(Configuration C11)

The temperature detection device according to Configuration C9 or C10, wherein the urging member is a spring member configured to urge the first portion of the holding member toward the measurement object.

(Configuration C12)

The temperature detection device according to any one of Configurations C9 to C11, wherein a portion of the urging member on one side in the first direction is configured to urge the holding member, and a portion of the urging member on another side in the first direction is fixed to the member configured to engage with the positioning portion.

(Configuration C13)

The temperature detection device according to any one of Configurations C9 to C12, wherein the detection element is abutted against the measurement object by urging force of the urging member.

(Configuration C14)

The temperature detection device according to any one of Configurations C9 to C12, further comprising a heat equalizing member disposed between the detection element and the measurement object in the third direction and configured to equalize distribution of heat from the measurement object, wherein the detection element is abutted against the heat equalizing member by urging force of the urging member

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2022-012625, filed on Jan. 31, 2022, and 2022-170799, filed on Oct. 25, 2022, which are hereby incorporated by reference herein in their entirety.

What is claimed is:

1. A fixing apparatus comprising:

a heater including a heating member, a first direction being a longitudinal direction of a surface of the heater on which the heating member is disposed, a second direction being a widthwise direction of the surface of the heater;

a heater holder configured to hold the heater;

a detection element that detects a temperature of the heater and is disposed at a position that faces the heater in a third direction, the third direction being a thickness direction of the heater orthogonal to both of the first direction and the second direction;

a first holding member configured to hold the detection element;

an urging member configured to urge the first holding member and extending in the first direction, a first end portion of the urging member in the first direction being fixed to the heater holder, a second end portion of the urging member opposite to the first end portion in the first direction being configured to come into contact with and press the first holding member;

a flexible member extending in the first direction and configured to support the first holding member on a first end portion of the flexible member in the first direction; and a second holding member configured to hold a second end portion of the flexible member in the first direction, wherein the flexible member is flexible such that the first holding member and the second holding member are movable relative to each other in the third direction, wherein the second holding member includes a positioning portion configured to engage with the heater holder and position the second holding member in the first direction and the second direction, wherein the first holding member is urged by the urging member toward the heater in the third direction, wherein the detection element includes a facing surface facing the heater, and wherein the second end portion of the urging member overlaps the facing surface of the detection element when viewed in the third direction.

2. The fixing apparatus according to claim 1, wherein the second holding member is movable in the third direction in a state where the second holding member is positioned by the positioning portion and the first holding member is urged by the urging member.

3. The fixing apparatus according to claim 1, wherein the urging member is a spring member configured to urge the first holding member toward the heater.

4. The fixing apparatus according to claim 1, wherein the first holding member and the second holding member are made of resin material, and wherein the flexible member is made of metal material and integrated with the first holding member and the second holding member by means of insert molding.

5. The fixing apparatus according to claim 1, wherein the first holding member includes an opening portion that is opened in the third direction, wherein the detection element is disposed inside the opening portion, and wherein a surface of the detection element opposite to the heater in the third direction is not in contact with other members.

6. The fixing apparatus according to claim 1, wherein the flexible member includes an intermediate portion formed between the first holding member and the second holding member and extending in the first direction, and wherein the intermediate portion has a plate shape with a thickness direction in the third direction.

7. The fixing apparatus according to claim 1, wherein the urging member is a spring member that is in contact with a surface of the flexible member opposite to the heater in the third direction.

8. The fixing apparatus according to claim 1, wherein the flexible member includes a facing surface configured to face the heater, wherein the detection element is positioned at a position that is separated more from the heater in the third direction than the facing surface is, and wherein a space between the detection element and the heater is filled with adhesive.

9. The fixing apparatus according to claim 1, wherein the flexible member includes a facing surface configured to face the heater, wherein in a state where a unit including the detection element, the flexible member, the first holding member, and the second holding member is not attached to the heater holder, the detection element is located closer to the heater in the third direction than the facing surface is, and wherein in a state where the unit is attached to the heater holder, the detection element is pressed against the heater by urging force of the urging member in a state in which the flexible member is elastically deformed.

10. The fixing apparatus according to claim 1, wherein the flexible member is configured to constitute one part of an electric circuit that transmits an electric signal outputted from the detection element.

11. The fixing apparatus according to claim 10, wherein a first electric wire and a second electric wire are connected to the second holding member, and wherein the flexible member includes a first member configured to electrically connect the first electric wire and one terminal of the detection element, and a second member configured to electrically connect the second electric wire and another terminal of the detection element.

12. The fixing apparatus according to claim 1, wherein the flexible member is a stainless-steel plate member.

13. The fixing apparatus according to claim 1, wherein one of the heater holder and the positioning portion includes a protruding portion protruding in the third direction, and wherein another one of the heater holder and the positioning portion includes an opening portion configured to fit on the protruding portion.

14. The fixing apparatus according to claim 1, wherein a portion of the urging member on one side in the first direction is configured to urge the first holding member, and a portion of the urging member on another side in the first direction is fixed to the heater holder.

15. The fixing apparatus according to claim 1, wherein the detection element is abutted against the heater by urging force of the urging member.

16. The fixing apparatus according to claim 1, further comprising a heat equalizing member disposed between the detection element and the heater in the third direction and configured to equalize distribution of heat from the heater, wherein the detection element is abutted against the heat equalizing member by urging force of the urging member.

17. The fixing apparatus according to claim 1, further comprising:

a tubular film configured to be rotated; and a pressing member, wherein the heater and the heater holder are disposed in an internal space of the film, wherein the pressing member is disposed so as to face the heater with the film interposed between the heater and the pressing member, and wherein the fixing apparatus is configured to fix an image to a recording material such that the film heated by the heater heats the image on the recording material while the film and the pressing member nipping and conveying the recording material in a nip portion formed between the heater and the pressing member.

18. An image forming apparatus comprising:

an image forming portion configured to form an image on a recording material; and the fixing apparatus according to claim 1 and configured to fix, by heating the image formed by the image forming portion, the image to the recording material.

19. A temperature detection device comprising:

a detection element including a surface that faces a measurement object and configured to detect a temperature of the measurement object, a first direction being a direction of a first side of the surface, a second direction being a direction of a second side of the surface orthogonal to the first side, a third direction being a direction orthogonal to both of the first direction and the second direction, the detection element being disposed so as to face the measurement object in the third direction;

a first holding member configured to hold the detection element;

an urging member configured to urge the first holding member and extending in the first direction;

a flexible member extending in the first direction and configured to support the first holding member on a first end portion of the flexible member in the first direction; and a second holding member configured to hold a second end portion of the flexible member in the first direction, wherein a first end portion of the urging member in the first direction is configured to be fixed to a holder to hold a unit including the detection element, the flexible member, the first holding member, and the second holding member, and a second end portion of the urging member opposite to the first end portion in the first direction is configured to come into contact with and press the first holding member, wherein the flexible member is flexible such that the first holding member and the second holding member are movable relative to each other in the third direction, wherein the second holding member includes a positioning portion configured to position the second holding member in the first direction and the second direction, wherein the first holding member is urged by the urging member toward the measurement object in the third direction, and wherein the second end portion of the urging member overlaps the surface of the detection element that faces the measurement object when viewed in the third direction.

20. The temperature detection device according to claim 19, wherein the second holding member is movable in the third direction in a state where the second holding member is positioned by the positioning portion and the first holding member is urged by the urging member.

21. The temperature detection device according to claim 19, wherein the urging member is a spring member configured to urge the first holding member toward the measurement object.

22. The temperature detection device according to claim 19, wherein the first holding member and the second holding member are made of resin material, and wherein the flexible member is made of metal material and integrated with the first holding member and the second holding member by means of insert molding.

23. The temperature detection device according to claim 19, wherein the first holding member includes an opening portion that is opened in the third direction, wherein the detection element is disposed inside the opening portion, and wherein a surface of the detection element opposite to the measurement object in the third direction is not in contact with other members.

24. The temperature detection device according to claim 19, wherein the flexible member includes an intermediate portion formed between the first holding member and the second holding member and extending in the first direction, and wherein the intermediate portion has a plate shape with a thickness direction in the third direction.

25. The temperature detection device according to claim 19, wherein the urging member is a spring member that is in contact with a surface of the flexible member opposite to the measurement object in the third direction.

26. The temperature detection device according to claim 19, wherein the flexible member includes a facing surface configured to face the measurement object, wherein the detection element is positioned at a position that is separated more from the measurement object in the third direction than the facing surface is, and wherein a space between the detection element and the measurement object is filled with adhesive.

27. The temperature detection device according to claim 19, wherein the flexible member includes a facing surface configured to face the measurement object, wherein in a state where the unit is not attached to the holder configured to hold the unit, the detection element is located closer to the measurement object in the third direction than the facing surface is, and wherein in a state where the unit is attached to the holder, the detection element is pressed against the measurement object by urging force of the urging member in a state in which the flexible member is elastically deformed.

28. The temperature detection device according to claim 19, wherein the flexible member is configured to constitute one part of an electric circuit that transmits an electric signal outputted from the detection element.

29. The temperature detection device according to claim 28, wherein the flexible member includes a first member configured to electrically connect a first electric wire of the electric circuit and one terminal of the detection element, and a second member configured to electrically connect a second electric wire of the electric circuit and another terminal of the detection element.

30. The temperature detection device according to claim 19, wherein the flexible member is a stainless-steel plate member.

31. The temperature detection device according to claim 19, wherein a portion of the urging member on one side in the first direction is configured to urge the first holding member, and a second end portion of the urging member on another side in the first direction is fixed to a member configured to position the positioning portion of the second holding member.

32. The temperature detection device according to claim 19, wherein the detection element is abutted against the measurement object by urging force of the urging member.

33. The temperature detection device according to claim 19, further comprising a heat equalizing member disposed between the detection element and the measurement object in the third direction and configured to equalize distribution of heat from the measurement object, wherein the detection element is abutted against the heat equalizing member by urging force of the urging member.

* * * * *